United States Patent
Satou et al.

(10) Patent No.: US 9,350,286 B2
(45) Date of Patent: May 24, 2016

(54) POWER CONVERTER

(71) Applicant: DENSO CORPORATION, Kariya, Aichi-pref. (JP)

(72) Inventors: Takafumi Satou, Okazaki (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 25 days.

(21) Appl. No.: 14/202,777

(22) Filed: Mar. 10, 2014

(65) Prior Publication Data

US 2014/0253006 A1  Sep. 11, 2014

(30) Foreign Application Priority Data

Mar. 11, 2013 (JP) .................. 2013-47983

(51) Int. Cl.
*H02P 1/26* (2006.01)
*H02P 25/22* (2006.01)

(52) U.S. Cl.
CPC .................... *H02P 25/22* (2013.01)

(58) Field of Classification Search
CPC .. H02P 25/22; H02P 29/0072; H02P 2209/03
USPC ......................... 318/771, 724, 288
See application file for complete search history.

(56) References Cited

U.S. PATENT DOCUMENTS

| 8,339,089 | B2 * | 12/2012 | Suzuki | ........................ | 318/496 |
|---|---|---|---|---|---|
| 8,604,730 | B2 * | 12/2013 | Suzuki | .................... | 318/400.02 |
| 2009/0009920 | A1 * | 1/2009 | Yamada | ................ | B60L 3/0023 361/93.1 |
| 2011/0221375 | A1 | 9/2011 | Suzuki | | |

FOREIGN PATENT DOCUMENTS

| JP | 7-46766 | 2/1995 |
|---|---|---|
| JP | 2009-254210 | 10/2009 |
| JP | 2009254210 A * | 10/2009 |

OTHER PUBLICATIONS

Koizumi et al, English Translation of JP2009254210A, "Motor controller and control method for motor", Oct. 29, 2009, pp. 1-13.*
Office Action (2 pages) dated Jan. 22, 2015 issued in corresponding Japanese Application No. 2013-047983 and English translation (2 pages).

* cited by examiner

*Primary Examiner* — Eduardo Colon Santana
*Assistant Examiner* — Bickey Dhakal
(74) *Attorney, Agent, or Firm* — Nixon & Vanderhye P.C.

(57) ABSTRACT

A power converter is for a rotating electrical machine including first and second winding sets, each of which has coils corresponding to phases of the rotating electrical machine. In the power converter, a first inverter energizes the first winding set, a second inverter energizes the second winding set, a current sensor detects a phase current flowing through each coil, and a control section drives the first and second inverters respectively based on first and second voltage command signals. The first inverter and the first winding set form a first system. The second inverter and the second winding set form a second system. The control section calculates the first and second voltage command signals so that average voltages applied to the first and second winding sets can be different from each other. The failure detector detects whether a short-circuit occurs between the first and second systems based on each phase current.

11 Claims, 18 Drawing Sheets

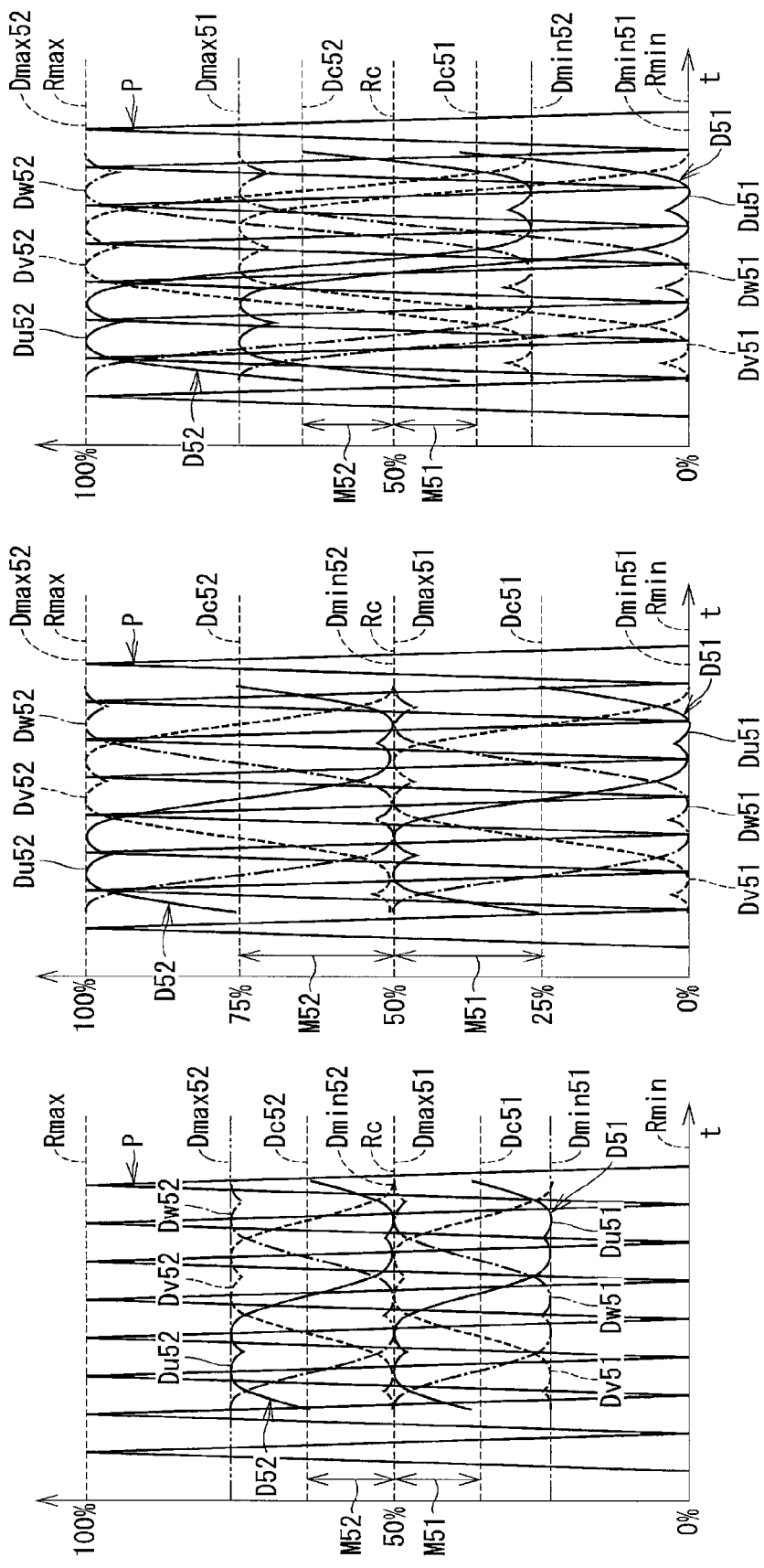

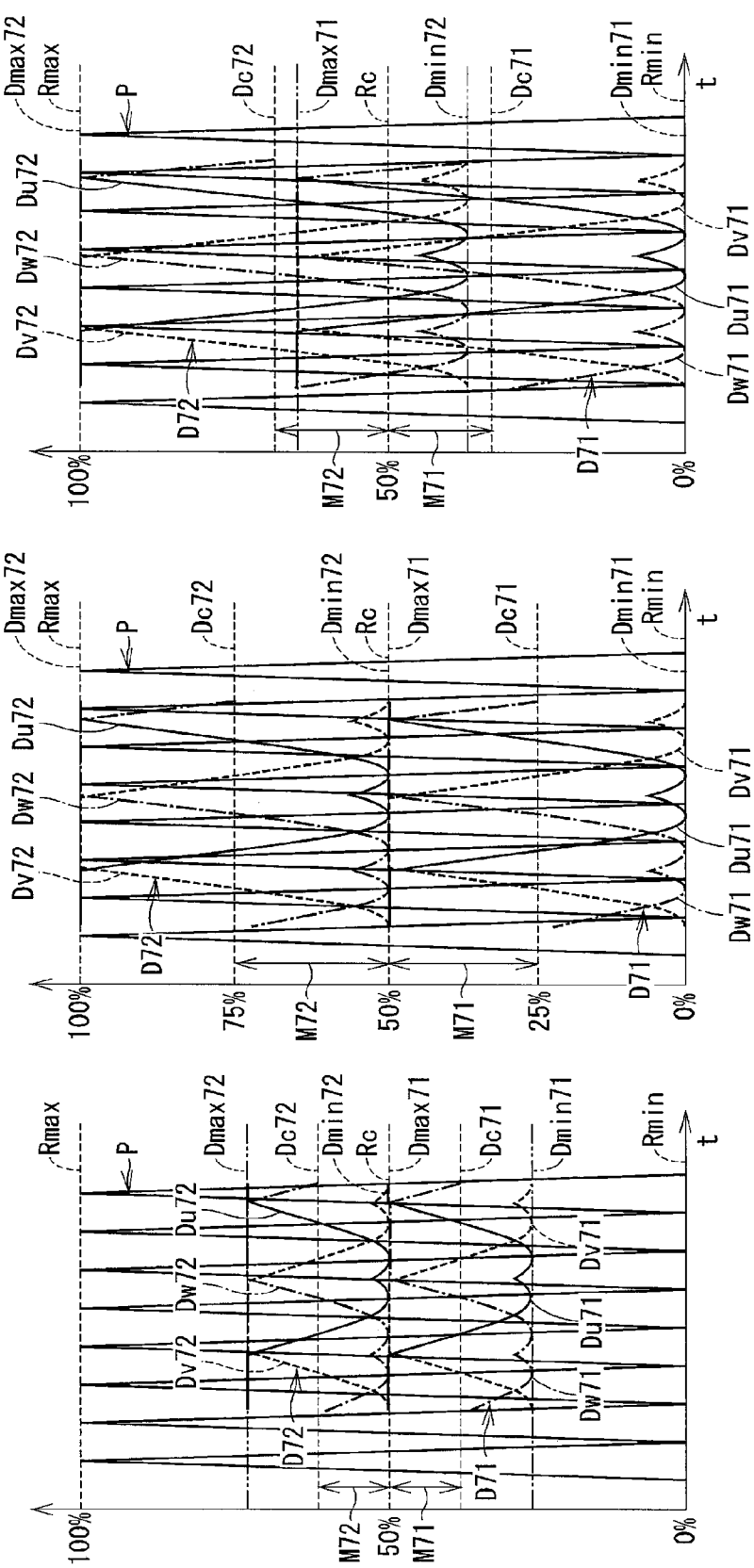

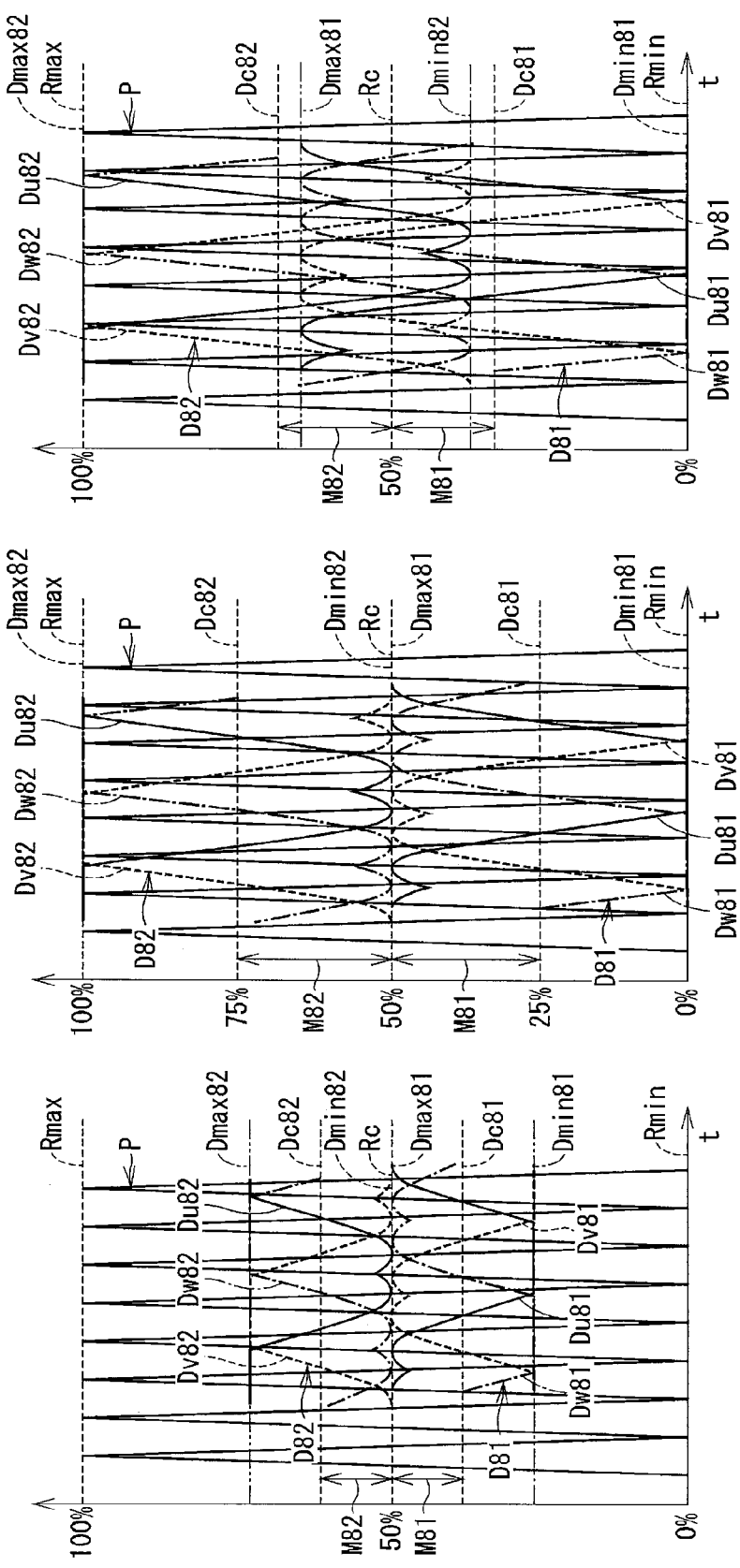

POWER CONVERTER

CROSS REFERENCE TO RELATED APPLICATION

This application is based on Japanese Patent Application No. 2013-47983 filed on Mar. 11, 2013, the contents of which are incorporated herein by reference.

FIELD

The present disclosure relates to a power converter.

BACKGROUND

A technique for driving two inverters in parallel has been known. For example, in JP-A-H7-46766, two inverters are driven in the same way, and a failure in the inverters is detected based on a comparison between magnitudes of output currents of the inverters.

SUMMARY

When multiple systems, each of which has one inverter and a corresponding configuration, are included, there is a possibility that a short-circuit occurs between the systems. If the short-circuit occurs, a short-circuit current flows according to a voltage difference between short-circuited points. However, in a case where the inverters of different systems are driven in the same way as disclosed in JP-A-H7-46766, when the same phases (e.g., U-phases) of the systems are short-circuited, no short-circuit current flows due to no voltage difference. Therefore, it is impossible to detect the short-circuit between the systems.

In view of the above, it is an object of the present disclosure to provide a power converter in which a short-circuit between systems can be detected.

According to an aspect of the present disclosure, a power converter is used for a rotating electrical machine including a first winding set having coils corresponding to phases of the rotating electrical machine and a second winding set having coils corresponding to the phases of the rotating electrical machine. The power converter includes a first inverter, a second inverter, a current sensor, and a control section. The first inverter energizes the first winding set. The second inverter energizes the second winding set. The current sensor detects a phase current flowing through each coil. The control section drives the first inverter based on a first voltage command signal and a PWM reference signal, and drives the second inverter based on a second voltage command signal and the PWM reference signal. The first inverter and the first winding set form a first system. The second inverter and the second winding set form a second system.

The control section includes a voltage command signal calculator and a failure detector. The voltage command signal calculator calculates the first voltage command signal and the second voltage command signal in such a manner that a first neutral-point voltage and a second neutral-point voltage are different from each other. The first neutral-point voltage is an average value of voltages applied to the first winding set. The second neutral-point voltage is an average value of voltages applied to the second winding set. The failure detector detects whether a short-circuit occurs between the first system and the second system based on each phase current.

When the short-circuit does not occur between the first system and the second system, each of the sum of the phase currents of the first system and the sum of the phase currents of the second system becomes zero in theory. In contrast, when the short-circuit occurs between the first system and the second system, a short-circuit current flows according to a voltage difference between short-circuited points, so that each of the sum of the phase currents of the first system and the sum of the phase currents of the second system becomes a value corresponding to the short-circuit current. It is noted that if there is no voltage difference between the short-circuited points, no short-circuit current flows.

Based on the above study, according to the aspect of the present disclosure, the first voltage command signal and the second voltage command signal are calculated so that the first neutral-point voltage and the second neutral-point voltage can be different from each other. Further, the first inverter is driven based on the first voltage command signal, and the second inverter is driven based on the second voltage command signal. In such an approach, a voltage applied to the first system can be different from a voltage applied to the second system. Accordingly, when the short-circuit occurs between the first system and the second system, a relatively large short-circuit current flows according to the voltage difference between the short-circuited points. Therefore, the short-circuit can be detected based on each phase current, for example, by monitoring the sum of the phase currents.

BRIEF DESCRIPTION OF THE DRAWINGS

The above and other objects, features and advantages of the present disclosure will become more apparent from the following detailed description made with reference to the accompanying drawings. In the drawings:

FIGS. 14A, 14B, and 14C are diagrams for explaining first and second duty command signals according to the fifth embodiment;

FIGS. 18A, 18B, and 18C are diagrams for explaining first and second duty command signals according to the seventh embodiment; and FIGS. 19A, 19B, and 19C are diagrams for explaining first and second duty command signals according to the eighth embodiment.

DETAILED DESCRIPTION

Embodiments of the present disclosure are described below with reference to the drawings.

First Embodiment

Figure 1:
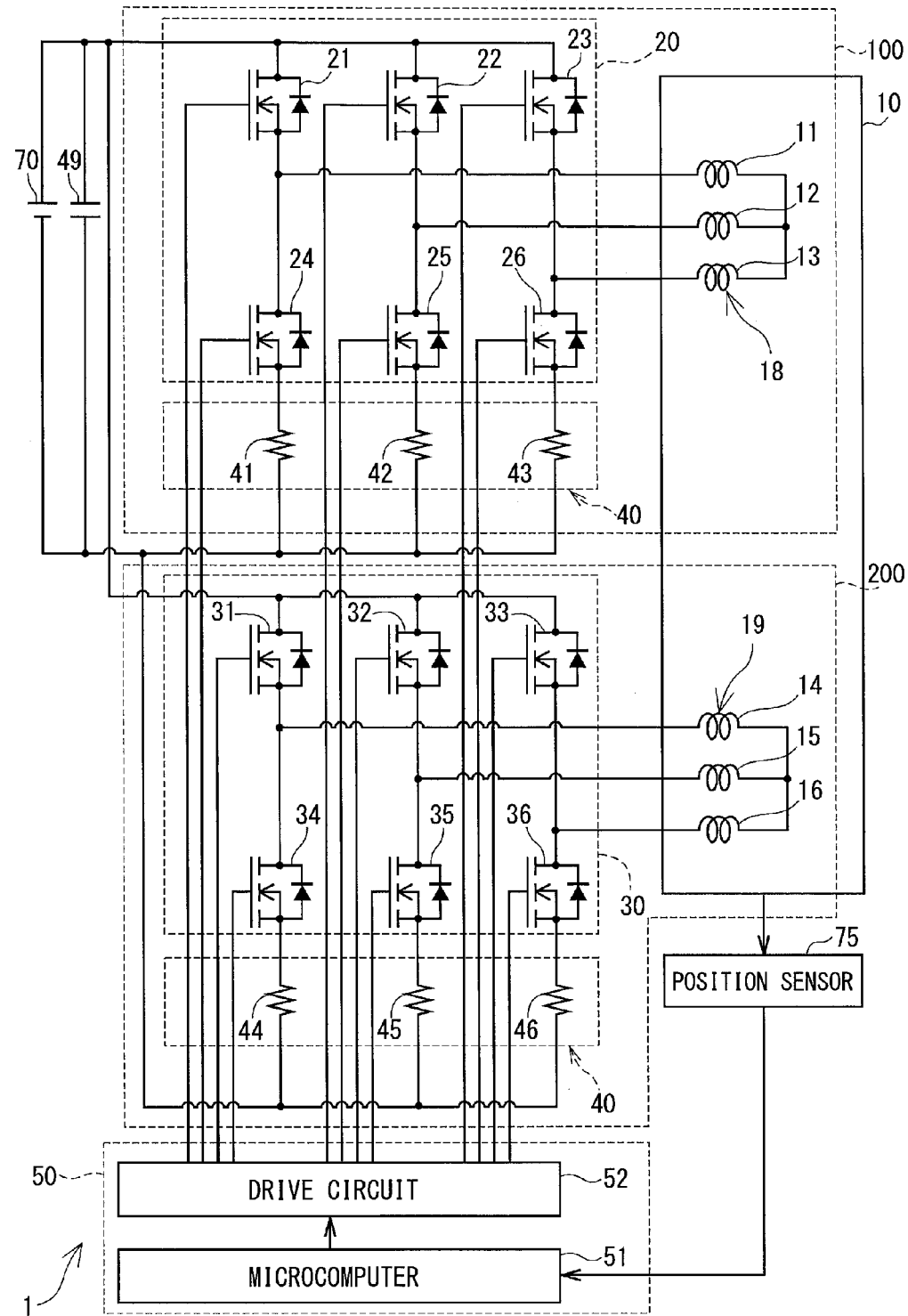
FIG. 1 is a block diagram of a power converter according to a first embodiment of the present disclosure.
Figure 2:
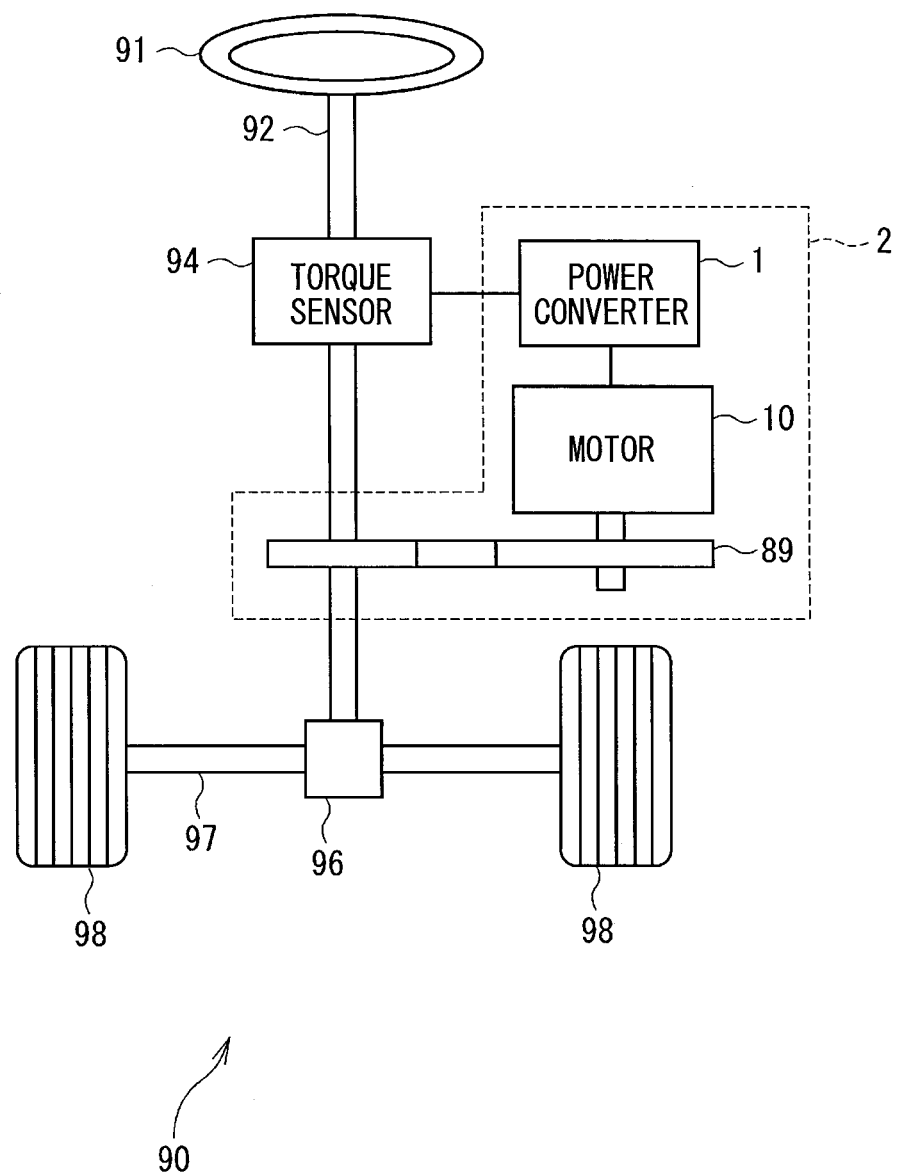
FIG. 2 is a diagram illustrating an electric power steering system according to the first embodiment.

As shown in FIG. 1, a power converter 1 according to a first embodiment of the present disclosure is used to convert electric power supplied to a motor 10 as a rotating electrical machine. According to the first embodiment, as shown in FIG. 2, the power converter 1 is applied to an electric power steering system 90. The steering system 90 works in conjunction with the motor 10 to assist a driver in steering a vehicle.

As shown in FIG. 2, the steering system 90 includes an electric power steering apparatus 2, a steering wheel (i.e., handle) 91, and a steering shaft 92. The steering wheel 91, which is operated by the driver, is connected to the steering shaft 92. An end of the steering shaft 92 is provided with a pinion gear 96. The pinion gear 96 meshes with a rack shaft 97. A tire wheel 98 is rotatably fixed to each end of the rack shaft 97 through a tie rod or the like. When the driver turns the steering wheel, the steering shaft 92 rotates. The rotation motion of the steering shaft 92 is converted by the pinion gear 96 to a linear motion of the rack shaft 97. Each tire wheel 98 is steered to an angle corresponding to a displacement of the linear motion of the rack shaft 97.

A torque sensor 94 for detecting a steering torque applied to the steering wheel 91 is mounted on the steering shaft 92.

The electric power steering apparatus 2 includes the power converter 1, the motor 10, and a gear 89. The motor 10 produces assist torque for assisting the driver in operating the steering wheel 91. The motor 10 is a three-phase brushless motor for allowing the gear 89 to rotate in forward and reverse directions. The gear 89 reduces a speed of rotation transmitted from the motor 10 and transmits the rotation to the steering shaft 92. Thus, the electric power steering apparatus 2 transmits the assist torque to the steering shaft 92 according to a steering direction and the steering torque of the steering wheel 91.

The motor 10 includes a stator, a rotor, and a shaft. The rotor rerates with the shaft. A permanent magnet is attached to a surface of the rotor so that the rotor can have magnetic poles. The rotor is located inside the stator and rotatably supported inside the stator. The stator has projections that project in a radially inward direction at a predetermined angle interval. Each of a U1 coil 11, a V1 coil 12, a W1 coil 13, a U2 coil 14, a V2 coil 15, and a W2 coil 16 is wound on a corresponding one of the projections of the stator. The U1 coil 11, the V1 coil 12, and the W1 coil 13 form a first winding set 18. The U2 coil 14, the V2 coil 15, and the W2 coil 16 form a second winding set 19. The U1 coil 11, the V1 coil 12, the W1 coil 13, the U2 coil 14, the V2 coil 15, and the W2 coil 16 correspond to coils recited in claims.

The motor 10 is provided with a position sensor 75 for detecting a rotation position θ.

As shown in FIG. 1, the power converter 1 includes a first inverter 20, a second inverter 30, and a control section 50.

The first inverter 20 is a three-phase inverter. The first inverter 20 includes six switching devices 21-26 which are connected in a bridge configuration to energize in turn the U1 coil 11, the V1 coil 12, and the W1 coil 13 of the first winding set 18. According to the first embodiment, each of the switching devices 21-26 is a metal-oxide semiconductor field-effect transistor (MOSFET). The switching devices 21-26 are hereinafter referred to as the MOSFETs 21-26, respectively.

The drains of the MOSFETs 21-23 are connected to a positive terminal of the battery 70. The sources of the MOSFETs 21-23 are connected to the drains of the MOSFETs 24-26, respectively. The sources of the MOSFETs 24-26 are connected to a negative terminal of the battery 70.

A connection point between the MOSFET 21 and the MOSFET 24, which are paired to each other, is connected to an end of the U1 coil 11. A connection point between the MOSFET 22 and the MOSFET 25, which are paired to each other, is connected to an end of the V1 coil 12. A connection point between the MOSFET 23 and the MOSFET 26, which are paired to each other, is connected to an end of the W1 coil 13.

Like the first inverter 20, the second inverter 30 is a three-phase inverter. The second inverter 30 includes six switching devices 31-36 which are connected in a bridge configuration to energize in turn the U2 coil 14, the V2 coil 15, and the W2 coil 16 of the second winding set 19. Each of the switching devices 21-26 is a MOSFET. The switching devices 31-36 are hereinafter referred to as the MOSFETs 31-36, respectively.

The drains of the MOSFETs 31-33 are connected to the positive terminal of the battery 70. The sources of the MOSFETs 31-33 are connected to the drains of the MOSFETs 34-36, respectively. The sources of the MOSFETs 34-36 are connected to the negative terminal of the battery 70.

A connection point between the MOSFET 31 and the MOSFET 34, which are paired to each other, is connected to an end of the U2 coil 14. A connection point between the MOSFET 32 and the MOSFET 35, which are paired to each other, is connected to an end of the V2 coil 15. A connection point between the MOSFET 33 and the MOSFET 36, which are paired to each other, is connected to an end of the W2 coil 16.

A combination of the first inverter 20 and the first winding set 18 is hereinafter collectively-referred to as the "first system 100". A combination of the second inverter 30 and the second winding set 19 is hereinafter collectively-referred to as the "second system 200".

The MOSFETs 21-23 and the MOSFETs 31-33, which are on the higher potential side, are sometimes refereed to as the "upper MOSFETs". The MOSFETs 24-26 and the MOSFETs 34-36, which are on the lower potential side, are sometimes refereed to as the "lower MOSFETs".

A current sensor 40 includes an U1 current detector 41, a V1 current detector 42, a W1 current detector 43, a U2 current detector 44, a V2 current detector 45, and a W2 current detector 46. According to the first embodiment, each of the current detectors 41-46 is a shunt resistor.

The U1 current detector 41 is provided to a lower potential side of the MOSFET 24. The V1 current detector 42 is provided to a lower potential side of the MOSFET 25. The W1 current detector 43 is provided to a lower potential side of the MOSFET 26.

The U1 current detector 41 is provided to a lower potential side of the MOSFET 24. The V1 current detector 42 is provided to a lower potential side of the MOSFET 25. The W1 current detector 43 is provided to a lower potential side of the MOSFET 26.

The U2 current detector 44 is provided to a lower potential side of the MOSFET 34. The V2 current detector 45 is provided to a lower potential side of the MOSFET 35. The W2 current detector 46 is provided to a lower potential side of the MOSFET 36.

A capacitor 49 is connected in parallel to the battery 70 and capable of being charged. The capacitor 49 supplements power supply to the MOSFETs 21-26 and the MOSFETs 31-36. Also, the capacitor 49 reduces or prevents noise such as a surge voltage.

The control section 50 controls the whole of the power converter 1 and includes a microcomputer 51, a drive circuit 52, and registers (not shown).

The microcomputer 51 obtains a U1 current Iu1 flowing through the U1 coil 11, a V1 current Iv1 flowing through the V1 coil 12, a W1 current Iw1 flowing through the W1 coil 13, a U2 current Iu2 flowing through the U2 coil 14, a V2 current Iv2 flowing through the V2 coil 15, a W2 current Iw2 flowing through the W2 coil 16, based on voltages across the current detectors 41-46. The U1 current Iut the V1 current Iv1, the W1 current Iw1, the U2 current Iu2, the V2 current Iv2, and the W2 current Iw2 are hereinafter sometimes referred to as the "phase currents Iu1, Ivi, Iw1, Iu2, Iv2, and Iw2", respectively. According to the first embodiment, the voltages across of the current detectors 41-46 are analog-to-digital (AD) converted and stored in the registers. The voltages across of the current detectors 41-46 are hereinafter sometimes referred to as the "AD values".

The microcomputer 51 controls ON and OFF of the MOSFETs 21-26 and the MOSFETs 31-36 through the drive circuit 52 based on the U1 current Iu1 the V1 current Iv1, the W1 current Iw1, the U2 current Iu2, the V2 current Iv2, and the W2 current Iw2 so that the motor 10 can output a desired torque.

Figure 3:
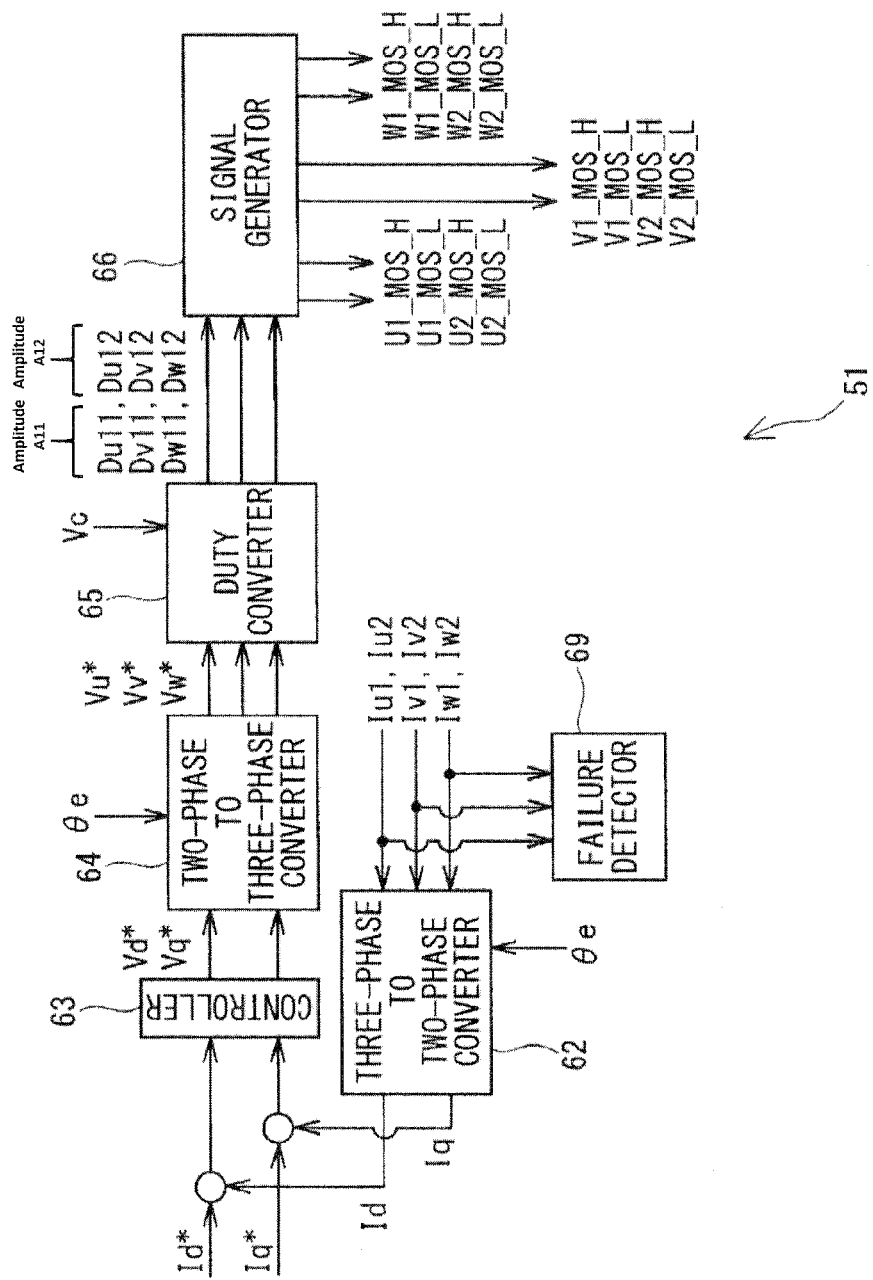
FIG. 3 is a block diagram of a microcomputer according to the first embodiment.

As shown in FIG. 3, the microcomputer 51 includes a three-phase to two-phase converter 62, a controller 63, a two-phase to three-phase converter 64, a duty converter 65, a signal generator 66, and a failure detector 69. A control process performed in the control section 50 is described below.

The three-phase to two-phase converter 62 reads the AD values, which are detected by the current sensor 40 and stored in the registers, from the registers and calculates the phase currents Iut Iv1, Iw1, Iu2, Iv2, and Iw2 based on the AD values. Further, the three-phase to two-phase converter 62 calculates a d-axis current detection value Id and a q-axis current detection value Iq based on the calculated phase currents Iut Iv1, Iw1, Iu2, Iv2, and Iw2 and the rotation position θ of the motor 10 obtained from the position sensor 75.

The controller 63 calculates a d-axis command voltage value Vd* and a q-axis command voltage value Vq* by performing a current feedback calculation based on the d-axis current detection value Id, the q-axis current detection value Iq, a d-axis current command value Id*, and a q-axis current command value Iq*. Specifically, the controller 63 calculates a d-axis current difference ΔId between the d-axis current command value Id* and the d-axis current detection value Id and a q-axis current difference ΔIq between the q-axis current command value Iq* and the q-axis current detection value Iq. Then, the controller 63 calculates the voltage command values Vd* and Vq* so that the current differences ΔId and ΔIq can converge to zero, thereby causing the current detection values Id and Iq to follow the current command values Id* and Iq*, respectively.

The two-phase to three-phase converter 64 calculates three-phase voltage command values Vu*, Vv*, and Vw* based on the voltage command values Vd* and Vq*, which are calculated by the controller 63, and the rotation position 8 of the motor 10. The duty converter 65 converts the three-phase voltage command values Vu*, Vv*, and Vw* to a first duty command signal D11 and a second duty command signal D12 based on a capacitor voltage Vc of the capacitor 49. The first duty command signal D11 corresponds to a first voltage command signal related to a voltage applied to the first winding set 18. The second duty command signal D12 corresponds to a second voltage command signal related to a voltage applied to the second winding set 19. According to the first embodiment, the first duty command signal D11 includes a U1 duty Du11, a V1 duty Dv11, and a W1 duty Dw11, and the second duty command signal D12 includes a U2 duty Du12, a V2 duty Dv12, and a W2 duty Dw12. The U1 duty Du11, the V1 duty Dv11, the W1 duty Dw11, the U2 duty Du12, the V2 duty Dv12, and the W2 duty Dw12 are hereinafter sometimes referred to as the "phase duties Du11, Dv11, Dw11, Du12, Dv12, and Dw12", respectively.

The U1 duty Du11, the V1 duty Dv11, and the W1 duty Dw11 are sinusoidal signals and different in phase from each other. Likewise, the U2 duty Du12, the V2 duty Dv12, and the W2 duty Dw12 are sinusoidal signals and different in phase from each other.

According to the first embodiment, each phase duty as a sinusoidal signal is represented as a formula "A sin δ+B", where a coefficient "A" of the sin δ term represents an amplitude of the phase duty. According to the first embodiment, an amplitude A11 of each of the phase duties Du11, Dv11, and Dw11 is equal to an amplitude A12 of each of the phase duties Du12, Dv12, and Dw12. That is, A11=A12. The amplitude A11 of each of the phase duties Du11, Dv11, and Dw11 is hereinafter sometimes referred to as the "amplitude A11 of the first duty command signal D11". Likewise, the amplitude A12 of each of the phase duties Du12, Dv12, and Dw12 is hereinafter sometimes referred to as the "amplitude A12 of the second duty command signal D12". It is noted that the term "B" in the formula "A sin δ+B" corresponds to shift amounts M11 and M12, which are described later.

The U1 duty Du11 is a signal related to a voltage applied to the U1 coil 11. The V1 duty Dv11 is a signal related to a voltage applied to the V1 coil 12. The W1 duty Dw11 is a signal related to a voltage applied to the W1 coil 13.

The U2 duty Du12 is a signal related to a voltage applied to the U2 coil 14. The V2 duty Dv12 is a signal related to a voltage applied to the V2 coil 15. The W2 duty Dw12 is a signal related to a voltage applied to the W2 coil 16.

Figure 4:
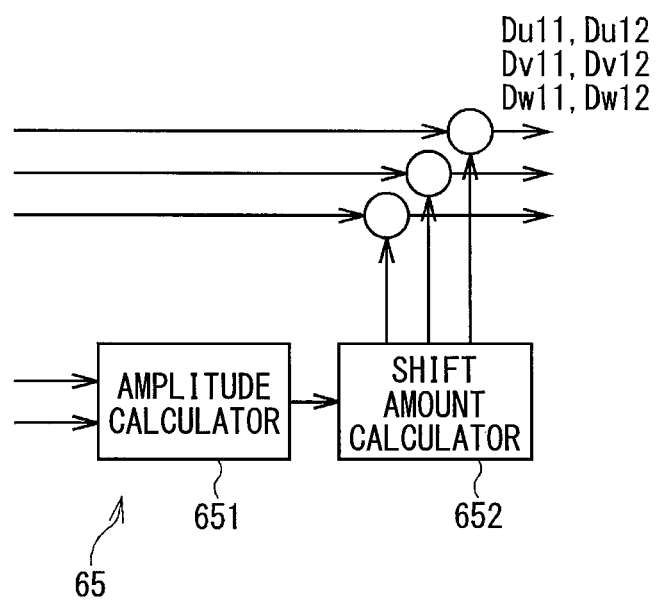
FIG. 4 is a block diagram of a duty converter according to the first embodiment.

As shown in FIG. 4, the duty converter 65 includes an amplitude calculator 651 and a shift amount calculator 652.

The amplitude calculator 651 calculates amplitudes of the three-phase voltage command values Vu*, Vv*, and Vw*.

The shift amount calculator 652 calculates shift amounts of the three-phase voltage command values Vu*, Vv*, and Vw calculated by the amplitude calculator 651. Then, the duties Du11, Dv11, Dw11, Du12, Dv12, and Dw12 are calculated based on the three-phase voltage command values Vu*, Vv*, and Vw, the phase shifts, and the capacitor voltage Vc. Then, the calculated duties Du11, Dv11, Dw11, Du12, Dv12, and Dw12 are stored in the registers.

Details of the duties Du11, Dv11, Dw11, Du12, Dv12, and Dw12 are described later.

Returning to FIG. 3, the signal generator 66 generates drive signals U1_MOS_H, U1_MOS_L, V1_MOS_H, V1_MOS_L, W1_MOS_H, and W1_MOS_L, for turning ON and OFF the MOSFETs 21-26, by comparing the phase duties Du11, Dv11, and Dw11 with a PWM reference signal P as a triangular wave signal and outputs the drive signals U1_MOS_H, U1_MOS_L, V1_MOS_H, V1_MOS_L, W1_MOS_H, and W1_MOS_L to the drive circuit 52. Likewise, the signal generator 66 generates drive signals U2_MOS_H, U2_MOS_L, V2_MOS_H, V2_MOS_L, W2_MOS_H, and W2_MOS_L, for turning ON and OFF the MOSFETs 31-36, by comparing the phase duties Du12, Dv12, and Dw12 with the PWM reference signal P and outputs the drive signals U2_MOS_H, U2_MOS_L, V2_MOS_H, V2_MOS_L, W2_MOS_H, and W2_MOS_L to the drive circuit 52.

When the signal generator 66 outputs the drive signal U1_MOS_H to the drive circuit 52, the drive circuit 52 turns ON the U1-phase upper MOSFET 21 and turns OFF the U1-phase lower MOSFET 24. In contrast, when the signal generator 66 outputs the drive signal U1_MOS_L to the drive circuit 52, the drive circuit 52 turns OFF the U1-phase upper MOSFET 21 and turns ON the U1-phase lower MOSFET 24. The same is true for the other phases of the first inverter 20 and the second inverter 30.

According to the first embodiment, although a process performed by in the signal generator 66 is implemented by electrical circuits of the microcomputer 51, this process can be implemented by either software or hardware.

The failure detector 69 detects a short-circuit failure between the first system 100 and the second system 200 based on the phase currents Iu1, Iv1, Iw1, Iu2, Iv2, and Iw2.

Figures 5A, 5B, 5C:
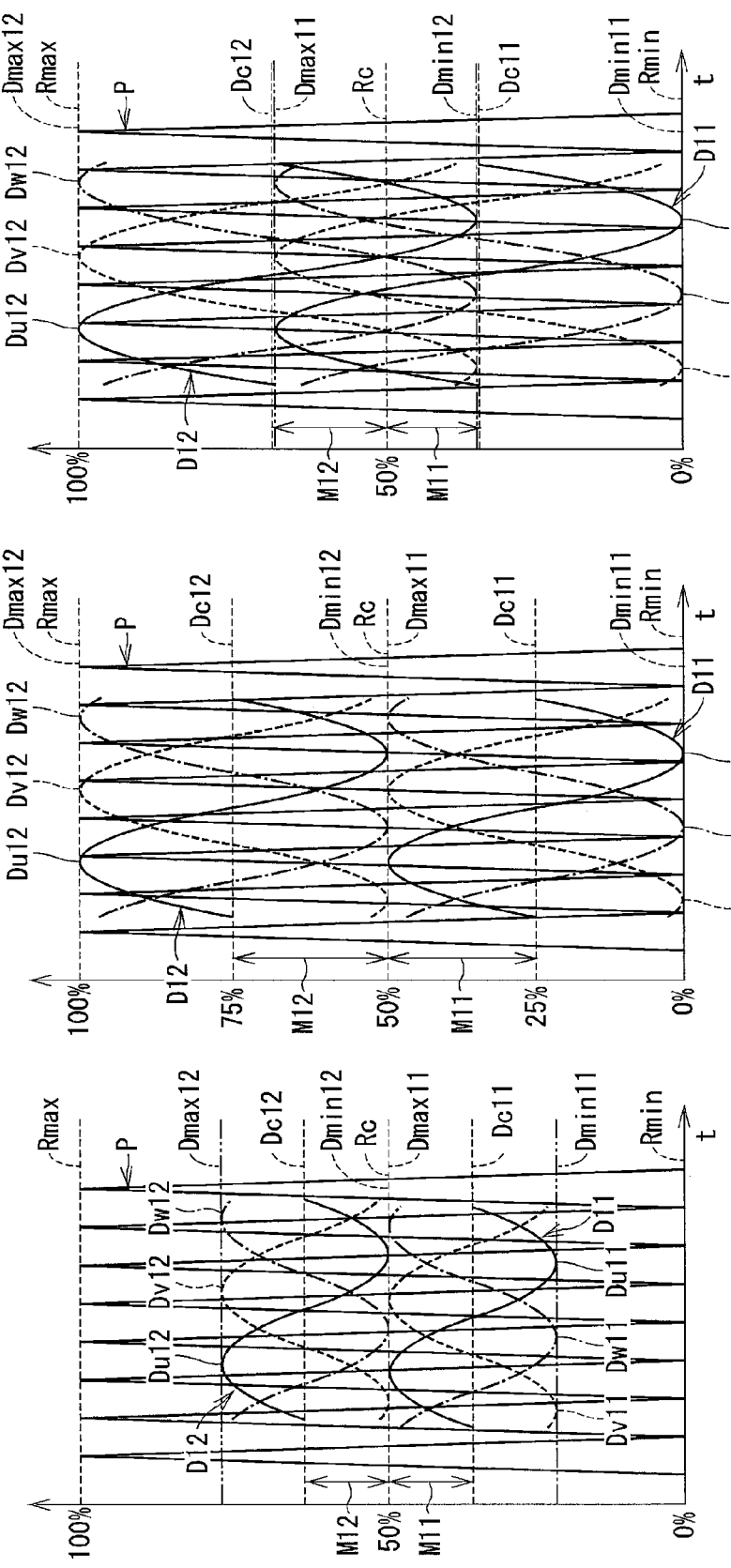
FIGS. 5A, 5B, and 5C are diagrams for explaining first and second duty command signals according to the first embodiment.

The first duty command signal D11 and the second duty command signal D12 are described below with reference to FIGS. 5A-5C. In FIGS. 5A-5C, a U-phase duty is indicated by a solid line, a V-phase duty is indicated by a broken line, and a W-phase duty is represented by a chain line.

According to the first embodiment, an outputtable duty range is set from 0% to 100% of the capacitor voltage Vc. That is, a lower limit value Rmin of the outputtable duty range is 0% of the capacitor voltage Vc, an upper limit value Rmax of the outputtable duty range is 100% of the capacitor voltage Vc, and a center value Rc of the outputtable duty range is 50% of the capacitor voltage Vc. The center value Rc is hereinafter referred to as the "output center value Rc". A first center value Dc11, which is a center value of the first duty command signal D11, is shifted from the output center value Rc in a lower direction. A second center value Dc12, which is a center value of the second duty command signal D12, is shifted from the output center value Rc in a higher direction. Even when the first center value Dc11 and the second center value Dc12 are shifted from the output center value Rc, voltages applied to the first winding set 18 and the second winding set 19 remain unchanged unless line voltages are changed.

As shown in FIGS. 5A and 5B, when the amplitude A11 of the first duty command signal D11 is not greater than 25% of the outputtable duty range, the first center value Dc11 is shifted in the lower direction so that the maximum value Dmax11 of the first duty command signal D11 can be equal to the output center value Rc.

Likewise, when the amplitude A12 of the second duty command signal D12 is not greater than 25% of the outputtable duty range, the second center value Dc12 is shifted in the higher direction so that the minimum value Dmin12 of the second duty command signal D12 can be equal to the output center value Rc.

As shown in FIG. 5B, when the amplitude A11 of the first duty command signal D11 is equal to 25% of the outputtable duty range, the minimum value Dmin11 of the first duty command signal D11 becomes equal to the lower limit value Rmin by shifting the first center value Dc11 in the lower direction so that the maximum value Dmax11 of the first duty command signal D11 can be equal to the output center value Rc. Accordingly, the first center value Dc11 of the first duty command signal D11 is shifted in the lower direction with respect to the output center value Rc by a value of 25% of the outputtable duty range. That is, the first center value Dc11 is given as follows: Dc11=Rc−25%=50%−25%=25%.

Likewise, when the amplitude A12 of the second duty command signal D12 is equal to 25% of the outputtable duty range, the maximum value Dmax12 of the second duty command signal D12 becomes equal to the upper limit value Rmax by shifting the second center value Dc12 in the higher direction so that the minimum value Dmin12 of the second duty command signal D12 can be equal to the output center value Rc. Accordingly, the second center value Dc12 is shifted in the higher direction with respect to the output center value Rc by a value of 25% of the outputtable duty range. That is, the second center value Dc12 is given as follows: Dc12=Rc+25%=50%+25%=75%.

As shown in FIG. 5C, when the amplitude A11 of the first duty command signal D11 is greater than 25% of the outputtable duty range, the first center value Dc11 is shifted in the lower direction so that the minimum value Dmin11 of the first duty command signal D11 can be equal to the lower limit value Rmin of the outputtable duty range. A reason for this is that if the first center value Dc11 is shifted in the lower direction so that the maximum value Dmax11 of the first duty command signal D11 can be equal to the output center value R under a condition where the amplitude A11 of the first duty command signal D11 is greater than 25% of the outputtable duty range, the minimum value Dmin11 of the first duty command signal D11 becomes smaller than the lower limit value Rmin of the outputtable duty range and consequently an output voltage may be distorted.

Likewise, when the amplitude A12 of the second duty command signal D12 is greater than 25% of the outputtable duty range, the second center value Dc12 is shifted in the higher direction so that the maximum value Dmax12 of the second duty command D12 can be equal to the upper limit value Rmax of the outputtable duty range. A reason for this is that if the second center value Dc12 is shifted in the higher direction so that the minimum value Dmin12 of the second duty command signal D12 can be equal to the output center value R under a condition where the amplitude A12 of the second duty command signal D12 is greater than 25% of the outputtable duty range, the maximum value Dmax12 of the second duty command signal D12 becomes greater than the upper limit value Rmax of the outputtable duty range and consequently an output voltage may be distorted.

That is, according to the first embodiment, when the amplitude A11 is not greater than 25% of the outputtable duty range, the first center value Dc11 is shifted in a direction away from the output center value Rc so that a first shift amount M11 of the first center value Dc11 from the output center value Rc can increase with an increase in the amplitude A11. In contrast, when the amplitude A11 is greater than 25% of the outputtable duty range, the first center value Dc11 is shifted in a direction toward the output center value Rc so that the first shift amount M11 of the first center value Dc11 from the output center value Rc can decrease with the increase in the amplitude A11.

Likewise, when the amplitude A12 is not greater than 25% of the outputtable duty range, the second center value Dc12 is shifted in a direction away from the output center value Rc so that a second shift amount M12 of the second center value Dc12 from the output center value Rc can increase with an increase in the amplitude A12. In contrast, when the amplitude A12 is greater than 25% of the outputtable duty range, the second center value Dc12 is shifted in a direction toward the output center value Rc so that the second shift amount M12 of the second center value Dc12 from the output center value Rc can decrease with the increase in the amplitude A12.

In other words, according to the first embodiment, the first shift amount M11 of the first center value Dc11 from the output center value Rc can change with the amplitude A11, and the second shift amount M12 of the second center value Dc12 from the output center value Rc can change with the amplitude A12.

It is noted that a voltage applied to the U1-phase of the first winding set 18 is calculated by multiplying the capacitor voltage Vc by the U1 duty Du11 and that an amplitude of the voltage applied to the U1-phase of the first winding set 18 is calculated by multiplying the capacitor voltage Vc by the amplitude A11. The same is true for the V1-phase and W1-phase of the first winding set 18. A first neutral-point voltage Va1, which is an average of the voltages applied to the first winding set 18, can be calculated by multiplying the capacitor voltage Vc by the first center value Dc11.

Likewise, a voltage applied to the U2-phase of the second winding set 19 is calculated by multiplying the capacitor voltage Vc by the U2 duty Du12 and that an amplitude of the voltage applied to the U2-phase of the second winding set 19 is calculated by multiplying the capacitor voltage Vc by the amplitude A12. The same is true for the V2-phase and W2-phase of the second winding set 19. A second neutral-point voltage Va2, which is an average of the voltages applied to the second winding set 19, can be calculated by multiplying the capacitor voltage Vc by the second center value Dc12.

As shown in FIGS. 5A and 5B, when the amplitude A11 and the amplitude A12 are not greater than 25% of the outputtable duty range, a difference between the first center value Dc11 and the second center value Dc12 is not less than the sum of the amplitude A11 and the amplitude A12. According to the first embodiment, the difference between the first center value Dc11 and the second center value Dc12 is equal to the sum of the amplitude A11 and the amplitude A12.

That is, a difference between the first neutral-point voltage Va1 and the second neutral-point voltage Va2 is not less than the sum of the amplitude of the voltage applied to each phase of the first winding set 18 and the amplitude of the voltage applied to each phase of the second winding set 19. According to the first embodiment, the difference between the first neutral-point voltage Va1 and the second neutral-point voltage Va2 is not less than the sum of the amplitude of the voltage applied to each phase of the first winding set 18 and the amplitude of the voltage applied to each phase of the second winding set 19.

Figure 6:
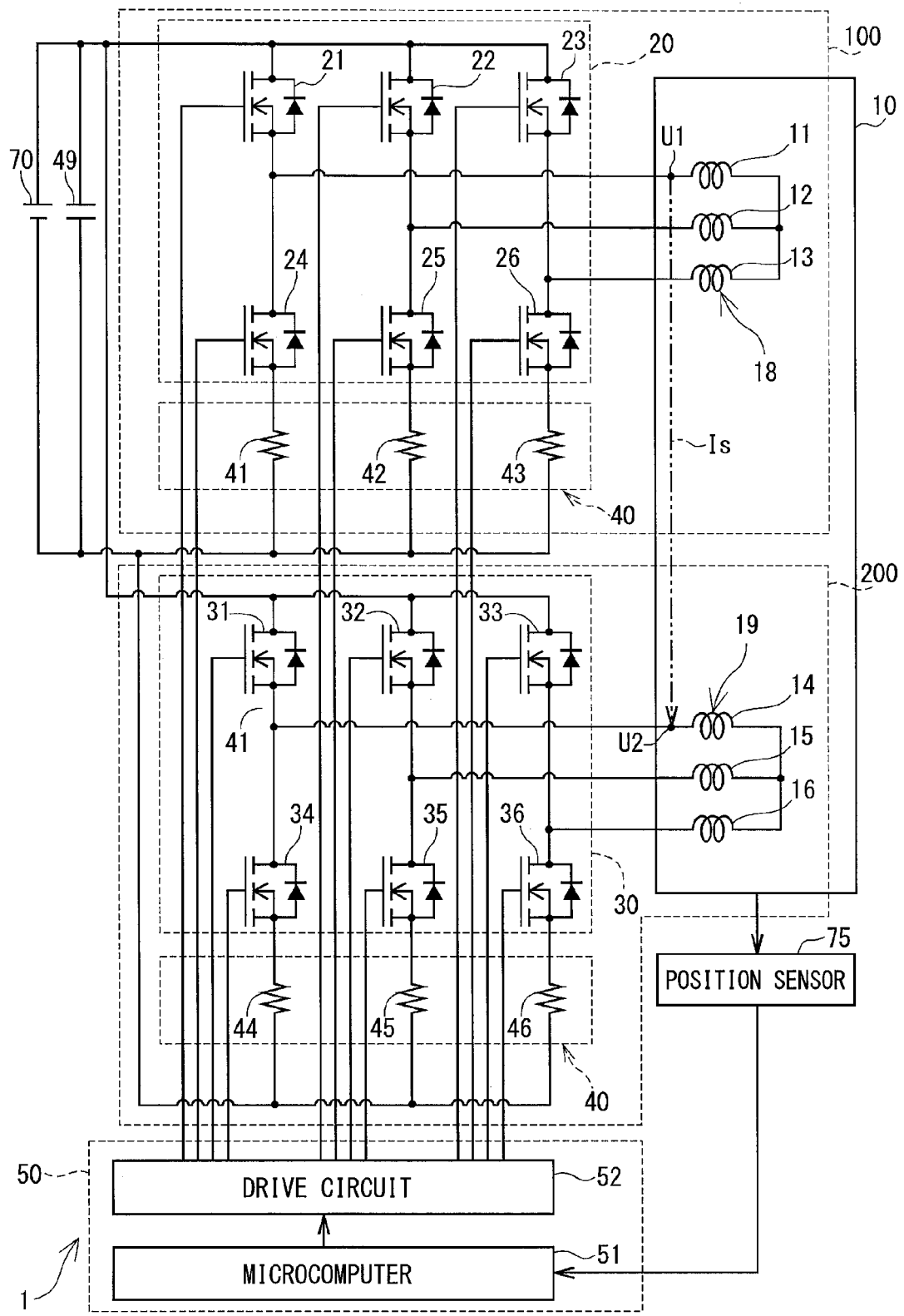
FIG. 6 is a diagram for explaining a short-circuit current flowing between systems of the power converter according to the first embodiment.

Next, the short-circuit failure between the first system 100 and the second system 200 is described below with reference to FIG. 6.

When the power converter 1 and the motor 10 are normal, the sum of the U1 current Iu1 flowing through the U1 coil 11, the V1 current Iv1 flowing through the V1 coil 12, and the W1 current Iw1 flowing through the W1 coil 13 becomes zero, and also the sum of the U2 current Iu2 flowing through the U2 coil 14, the V2 current Iv2 flowing through the V2 coil 15, and the W2 current Iw2 flowing through the W2 coil 16 becomes zero. The sum of the U1 current Iu1, the V1 current Iv1, and the W1 current Iw1 is hereinafter referred to as the "first system three-phase sum It1". Likewise, the sum of the U2 current Iu2, the V2 current Iv2, and the W2 current Iw2 is hereinafter referred to as the "second system three-phase sum It2".

In contrast, when a short-circuit occurs between the first system 100 and the second system 200 and consequently the power converter 1 and the motor 10 becomes abnormal, a short-circuit current Is flows between the first system 100 and the second system 200 according to a voltage difference between short-circuited points. For example, as indicated by a two-dot chain line in FIG. 6, when a short-circuit occurs between a point U1 of the first system 100 and a point U2 of the second system 200, and a voltage of the point U1 is higher than a voltage of the point U2, the short-circuit current Is flows according to a voltage difference between the point U1 and the point U2. When the short-circuit current Is flows between the first system 100 and the second system 200, the sum of the phases current becomes equal to a value corresponding to the short-circuit current Is. Specifically, one of the first system three-phase sum It1 and the second system three-phase sum It2 becomes equal to Is, and the other of the first system three-phase sum It1 and the second system three-phase sum It2 becomes equal to −Is. In an example shown in FIG. 6, since the first system 100 is located on a higher potential side than the second system 200, the first system three-phase sum It1 becomes equal to −Is, and the second system three-phase sum It2 becomes equal to Is.

When the first inverter 20 and the second inverter 30 are driven in the same manner based on the same duty command signal, the same phase has almost the same voltage. For example, in FIG. 1, the voltage of the point U1 is almost equal to the voltage of the point U2. Therefore, when the short-circuit occurs between the same phases of the first system 100 and the second system 200, for example, between the point U1 and the point U2, the short-circuit current Is is small due to a small voltage difference between the point U1 and the point U2. In this case, since each of the first system three-phase sum It1 and the second system three-phase sum It2 becomes almost zeo, it is difficult to determine whether the short-circuit occurs between the first system 100 and the second system 200. The same is true for when the short occurs between the V1 phase and the V2 phase or between the W1 phase and the W2 phase.

Based on the above study, according to the first embodiment, the first duty command signal D11 is shifted in the lower direction, and the second duty command signal D12 is shifted in the higher direction so that the first neutral-point voltage Va1 and the second neutral-point voltage Va2 can be different from each other. Further, the first inverter 20 is driven based on the first duty command signal D11, and the second inverter 30 is driven based on the second duty command signal D12 different from the first duty command signal D11. Thus, a voltage applied to the first system 100 becomes different from a voltage applied to the second system 200. Accordingly, when the short-circuit occurs between the first system 100 and the second system 200, a relatively large short-circuit current Is flows according to the voltage difference between the short-circuited points. Even when the short-circuit occurs between the same phases, for example, between the point U1 and the point U2, a relatively large short-circuit current Is flows according to the voltage difference. Therefore, the short-circuit failure can be detected by detecting the short-circuit current Is.

According to the first embodiment, the short-circuit failure is detected based on the first system three-phase sum It1 and the second system three-phase sum It2.

Next, a short-circuit failure detection process for detecting the short-circuit failure between the first system 100 and the second system 200 is described below with reference to FIG. 7. This detection process is performed by the microcomputer 51 of the control section 50 at a predetermined time interval.

The detection process starts at S101, where it is determined whether the sum of an absolute value of the first system three-phase sum It1 and an absolute value of the second system three-phase sum It2 is greater than a predetermined determination threshold E1. The determination threshold E1 is set to a value greater than zero according to variations of the current sensor 40. If the sum of the absolute value of the first system three-phase sum It1 and the absolute value of the second system three-phase sum It2 is greater than the determination threshold E1 corresponding to YES at S101, the detection process proceeds to S103. In contrast, if the sum of the absolute value of the first system three-phase sum Id and the absolute value of the second system three-phase sum It2 is not greater than the determination threshold E1 corresponding to NO at S101, the detection process proceeds to S102.

At S102, it is determined that the short-circuit failure does not occur, and then the detection process ends. It is preferable that failures other than the short-circuit failure should be detected by other processes. When the power converter 1 is normal, i.e., when the power converter 1 does not suffer from any failure including the short-circuit failure, the MOSFETs 21-26 of the first inverter 20 are turned ON and OFF based the first duty command signal D11, and the MOSFETs 31-36 of the second inverter 30 are turned ON and OFF based the second duty command signal D12. Thus, when the power converter 1 is normal, the motor 10 is driven and controlled by two systems: the first system 100 and the second system 200.

At S103, to which the detection process proceeds if it is determined that the sum of the absolute value of the first system three-phase sum It1 and the absolute value of the second system three-phase sum It2 is greater than the determination threshold E1 corresponding to YES at S101, it is determined that the power converter 1 is abnormal. According to the first embodiment, at S103, it is identified that the abnormality in the power converter 1 results from the short-circuit failure between the first system 100 and the second system 200.

Then, at S104, one of the first inverter 20 and the second inverter 30 stops being driven, and the other of the first inverter 20 and the second inverter 30 continues being driven, so that the motor 10 continues being driven by one system: the first system or the second system 200. Thus, when the short-circuit failure occurs between the first system 100 and the second system 200, the motor 10 is driven in a back up manner by one system.

For example, when the first inverter 20 stops being driven, and the second inverter 30 continues being driven, the signal generator 66 outputs the drive signals so that all the MOSFETs 21-26 of the first inverter 20 can be turned OFF. Alternatively, when the first inverter 20 continues being driven, and the second inverter 30 stops being driven, the signal generator 66 outputs the drive signals so that all the MOSFETs 31-36 of the second inverter 30 can be turned OFF.

For example, when the power converter 1 is abnormal, and the motor 10 continues being driven by the second system 200, the output of the second system 200 can be increased compared to when the power converter 1 is normal. Alternatively, in this case, the output of the second system 200 can remain unchanged compared to when the power converter 1 is normal.

According to the first embodiment, as shown in FIGS. 5A and 5B, when the amplitude A11 and the amplitude A12 are not greater than 25% of the outputtable duty range, the difference between the first center value Dc11 and the second center value Dc12 is equal to the sum of the amplitude A11 and the amplitude A12. As long as the difference between the first center value Dc11 and the second center value Dc12 is not less than the sum of the amplitude A11 and the amplitude A12, the first duty command signal D11 and the second duty command signal D12 don't overlap each other. Accordingly, the voltage applied to the first system 100 is always different from the voltage applied to the second system 200 regardless of the phases of the motor 10 and the phases of the duty command signals. Therefore, the short-circuit failure between the first system 100 and the second system 200 can be detected regardless of the short-circuited points and the phases.

In contrast, as shown in FIG. 5C, when the amplitude A11 and the amplitude A12 are greater than 25% of the outputtable duty range, the difference between the first center value Dc11 and the second center value Dc12 becomes less than the sum of the amplitude A11 and the amplitude A12. Therefore, the first duty command signal D11 and the second duty command signal D12 overlap each other. Therefore, depending on the phases of the duty command signals, the voltage difference between the short-circuited points may become small, so that the short-circuit current Is may become close to zero. However, the short-circuit failure between the first system 100 and the second system 200 can be detected except for such specific phases of the duty command signals.

The first embodiment can be summarized as follows.

(1) According to the first embodiment, the power converter 1 is used for the motor 10 having the first winding set 18 and the second winding set 19. The first winding set 18 includes the U1 coil 11, the V1 coil 12, and the W1 coil 13. The second winding set 19 includes the U2 coil 14, the V2 coil 15, and the W2 coil 16. The power converter 1 includes the first inverter 20, the second inverter 30, and the control section 50. The first inverter 20 is provided for the first winding set 18, and the combination of the first inverter 20 and the first winding set 18 form the first system 100. The second inverter 30 is provided for the second winding set 19, and the combination of the second inverter 30 and the second winding set 19 form the second system 200. The control section 50 drives and controls the first inverter 20 and the second inverter 30 based on the first duty command signal D11 related to the driving of the first inverter 20, the second duty command signal D12 related to the driving of the second inverter 30, and the PWM reference signal P.

The control section 50 includes the duty converter 65 and the failure detector 69. The duty converter 65 calculates the first duty command signal D11 and the second duty command signal D12 so that the first neutral-point voltage Va1, which is an average of the voltages applied to the first winding set 18, can be different from the second neutral-point voltage Va2, which is an average of the voltages applied to the second winding set 19.

The failure detector 69 detects the short-circuit failure between the first system 100 and the second system 200 based on the phase currents Iu1, Iv1, Iw1, Iu2, Iv2, and Iw2.

When the short-circuit failure does not occur between the first system 100 and the second system 200, each of the first system three-phase sum It1 and the second system three-phase sum It2 becomes zero in theory. In contrast, when the short-circuit failure occurs between the first system 100 and the second system 200, the short-circuit current Is flows according to a voltage difference between the short-circuited points, so that each of the first system three-phase sum It1 and the second system three-phase sum It2 becomes equal to a value corresponding to the short-circuit current Is. It is noted that if there is no voltage difference between the short-circuited points, no short-circuit current flows.

For the above reason, according to the first embodiment, the first duty command signal D11 and the second duty command signal D12 are calculated so that the first neutral-point voltage Va1 can be different from the second neutral-point voltage Va2. Further, the first inverter 20 is driven based on the first duty command signal D11, and the second inverter 30 is driven based on the second duty command signal D12. In such an approach, the voltage applied to the first system 100 can be different from the voltage applied to the second system 200. Accordingly, when the short-circuit occurs between the first system 100 and the second system 200, a relatively large short-circuit current Is flows according to the voltage difference between the short-circuited points. Therefore, the short-circuit failure can be detected based on the phase currents, for example, by monitoring the sum of the three phase currents.

(2) The duty converter 65 calculates the first duty command signal D11 and the second duty command signal D12 so that the difference between the first neutral-point voltage Va1 and the second neutral-point voltage Va2 can be not less than the sum of the amplitude of the voltage applied to each phase of the first winding set 18 and the amplitude of the voltage applied to each phase of the second winding set 19. In particular, according to the first embodiment, when the amplitude A11 and the amplitude A12 are not greater than 25% of the outputtable duty range, the difference between the first neutral-point voltage Va1 and the second neutral-point voltage Va2 is equal to the sum of the amplitude of the voltage applied to each phase of the first winding set 18 and the amplitude of the voltage applied to each phase of the second winding set 19.

Accordingly, since the voltage applied to the phase of the first winding set 18 is always different from the voltage applied to the phase of the second winding set 19, a relatively large short-circuit current Is flows. Thus, the short-circuit failure can be surely detected. Further, since the line voltage applied to the first winding set 18 and the second winding set 19 has a sinusoidal waveform, a ripple current can be reduced or prevented.

(3) The failure detector 69 detects the short-circuit failure based on the sum of the absolute value of the first system three-phase sum It1, which is the sum of the phases currents Iu1, Iv1, and Iw1 of the first winding set 18, and the absolute value of the second system three-phase sum It2, which is the sum of the phases currents Iu2, Iv2, and Iw2 of the second winding set 19. Specifically, when the sum of the absolute value of the first system three-phase sum It1 and the absolute value of the second system three-phase sum It2 is greater than the determination threshold E1, the failure detector 69 determines that the short-circuit failure occurs. Thus, the short-circuit failure can be suitably detected based on the phase currents Iu1, Iv1, Iw1, Iu2, Iv2, and Iw2.

(4) When the short-circuit failure is detected, the control section 50 stops driving one of the first inverter 20 and the second inverter 30 while continuing driving the other of the first inverter 20 and the second inverter 30. In such an approach, even when the short-circuit failure occurs, the motor 10 can continue being driven. In particular, according to the first embodiment, since the power converter 1 and the motor 10 are used for the steering system 90, the steering system 90 can continue assisting the driver in steering the vehicle. It is preferable that a steering feeling given to the driver should be different between when the power converter 1 is normal and when the motor 10 is driven in a back up manner by one system due to the short-circuit failure. Alternatively, when the motor 10 is driven in a back up manner, the driver can be informed, for example, by illumination of a warning lamp, that the short-circuit failure occurs.

(5) The duty converter 65 calculates the first duty command signal D11 so that the first center value Dc11, which is the center value of the first duty command signal D11, can be less than the output center value Rc, which is the center value of the outputtable duty range. Further, the duty converter 65 calculates the second duty command signal D12 so that the second center value Dc12, which is the center value of the second duty command signal D12, can be greater than the output center value Rc. Accordingly, the difference between the first neutral-point voltage Va1 and the second neutral-point voltage Va2 is increased, so that the short-circuit current Is flowing when the short-circuit failure occurs is increased. Therefore, the short-circuit failure can be suitably detected.

(6) The first shift amount M11 between the first center value Dc11 and the output center value Rc can change with the amplitude A11 of the first duty command signal D11. The second shift amount M12 between the second center value Dc12 and the output center value Rc can change with the amplitude A12. In such an approach, the difference between the first neutral-point voltage Va1 and the second neutral-point voltage Va2 can be increased according to the amplitudes A11 and A12 within a scope that does not distort the output voltage. Accordingly, since the short-circuit current Is flowing when the short-circuit failure occurs is increased, the short-circuit failure can be suitably detected.

By the way, as the shift amount from the output center value Rc is larger, a difference between a ON period of the upper MOSFETs 21-23 and 31-33 and a ON period of the lower MOSFETs 24-26 and 34-36 is larger. When the ON period of the upper MOSFETs 21-23 and 31-33 differs from the ON period of the lower MOSFETs 24-26 and 34-36, heat loss in the upper MOSFETs 21-23 and 31-33 differs from heat loss in the lower MOSFETs 24-26 and 34-36.

(7) For the above reason, the maximum value Dmax11 of the first duty command signal D11, which is shifted from the output center value Rc in the lower direction, is set to the output center value Rc, and the minimum value Dmin12 of the second duty command signal D12, which is shifted from the output center value Rc in the higher direction, is set to the output center value Rc. According to the first embodiment, in particular, when the amplitude A11 of the first duty command signal D11 and the amplitude A12 of the second duty command signal D12 are not greater than 25% of the outputtable duty range, the maximum value Dmax11 and the minimum value Dmin12 are set to the output center value Rc.

Thus, the shift amounts M11 and M12 from the output center value Rc can be made as small as possible in such a manner that the first duty command signal D11 and the second duty command signal D12 don't overlap each other. Accordingly, a difference between the heat loss in the upper MOSFETs 21-23 and 31-33 and the heat loss in the lower MOSFETs 24-26 and 34-36 is reduced.

(8) Further, the minimum value Dmin11 of the first duty command signal D11, which is shifted from the output center value Rc in the lower direction, is set to the lower limit value Rmin of the outputtable duty range, and the maximum value Dmax12 of the second duty command signal D12, which is shifted from the output center value Rc in the higher direction, is set to the upper limit value Rmax of the outputtable duty range. According to the first embodiment, in particular, when the amplitude A11 of the first duty command signal D11 and the amplitude A12 of the second duty command signal D12 are greater than 25% of the outputtable duty range, the minimum value Dmin11 is set to the lower limit value Rmin, and the maximum value Dmax12 is set to the upper limit value Rmax.

Thus, the difference between the first neutral-point voltage Va1 and the second neutral-point voltage Va2 can be made as large as possible in such a manner that the output voltage is not distorted. Accordingly, since the short-circuit current Is, which flows when the short-circuit occurs between the first system 100 and the second system 200, is increased, the short-circuit can be suitably detected.

Correspondence between terms used in the first embodiment and claims is as follows. The control section 50 corresponds to a voltage command signal calculator and a failure detector. Specifically, the duty converter 65 corresponds to a voltage command signal calculator, and the failure detector 69 corresponds to a failure detector.

Figure 7:
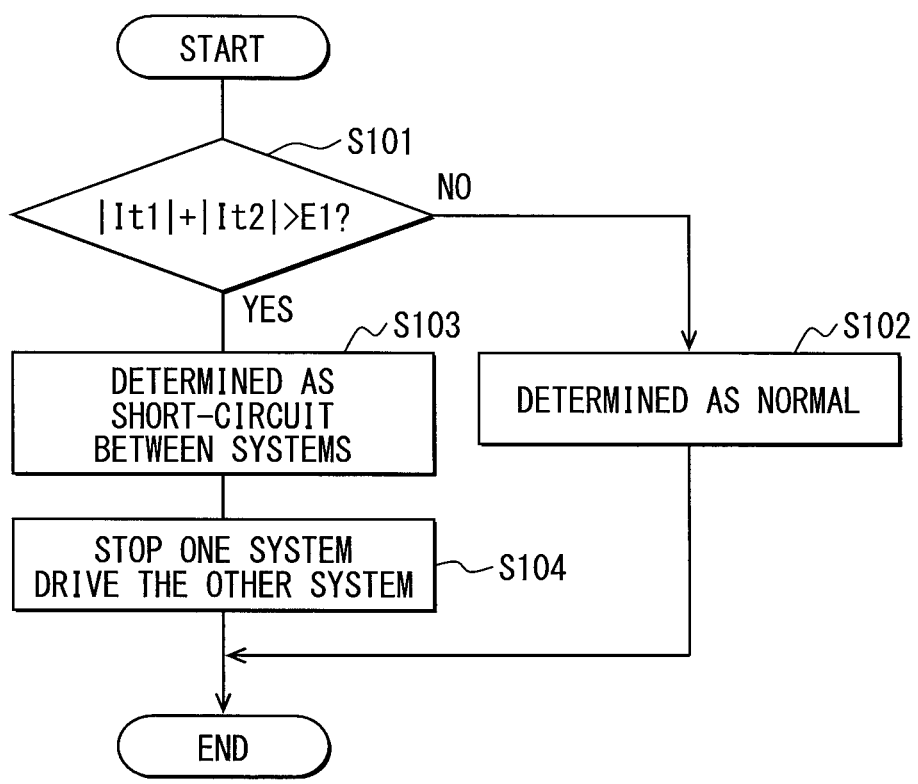
FIG. 7 is a flowchart of a failure detection process according to the first embodiment.

S101, S102, and S103 in FIG. 7 correspond to procedures as a function of a failure detector.

Second Embodiment

A second embodiment of the present disclosure is described below with reference to FIG. 8. The second embodiment differs from the first embodiment in the short-circuit failure detection process for detecting the short-circuit failure between the first system 100 and the second system 200.

Figure 8:
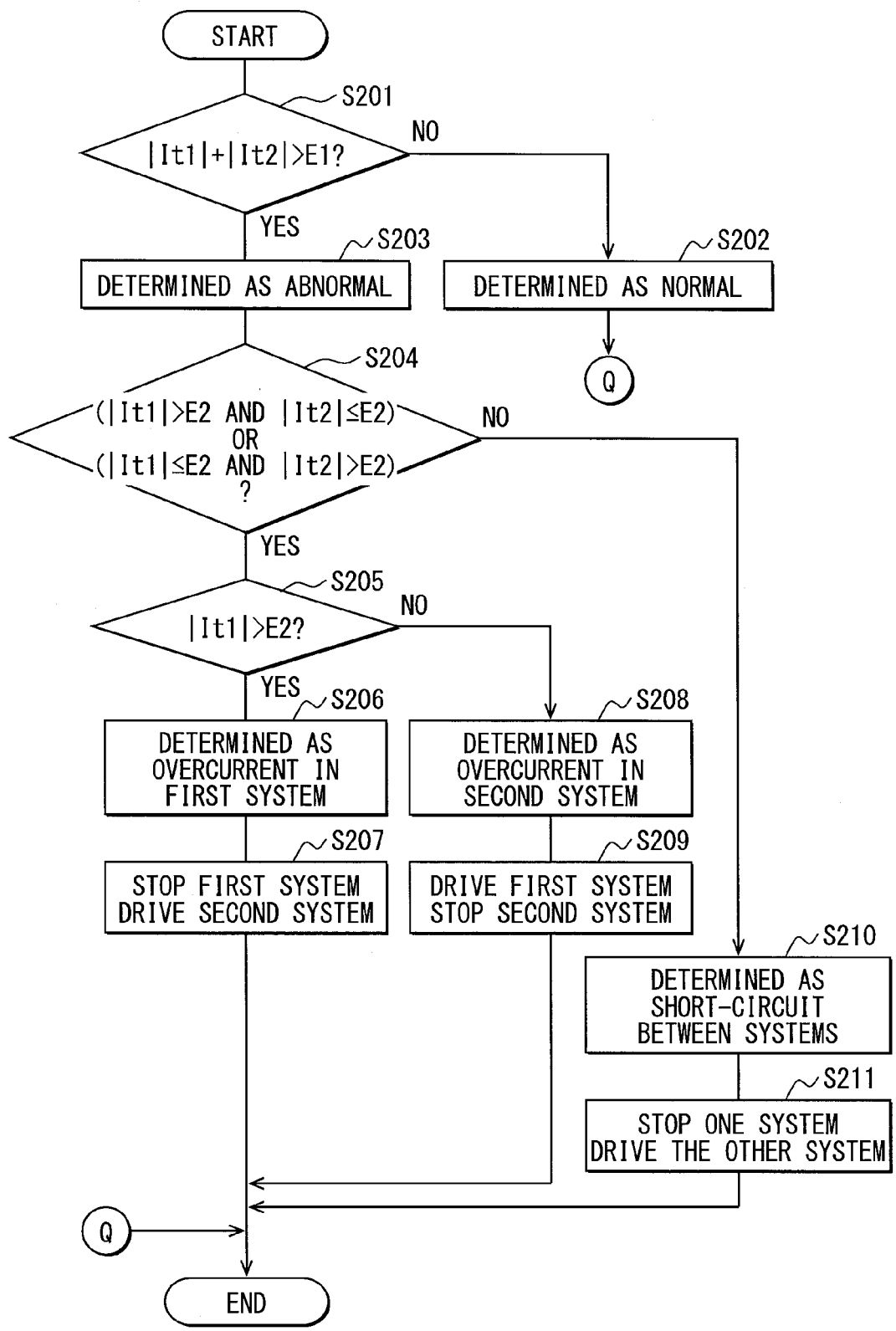
FIG. 8 is a flowchart of a failure detection process according to the second embodiment of the present disclosure.

The detection process according to the second embodiment is shown in FIG. 8 and performed by the microcomputer 51 of the control section 50 at a predetermined time interval.

Procedures performed at S201 and S202 are the same as the procedures performed at S101 and S102, respectively.

At S203, to which the detection process proceeds if it is determined that the sum of the absolute value of the first system three-phase sum It1 and the absolute value of the second system three-phase sum It2 is greater than the determination threshold E1 corresponding to YES at S201, it is determined that the power converter 1 is abnormal due to any failure. According to the second embodiment, at S103, it is not identified that the abnormality in the power converter 1 results from the short-circuit failure between the first system 100 and the second system 200 in consideration of the possibility that the abnormality in the power converter 1 may result from other failures such as an overcurrent failure occurring in one system.

Then, at S204, it is determined whether one of first and second conditions is satisfied. The first condition is satisfied when the absolute value of the first system three-phase sum It1 is greater than a predetermined determination threshold E2, and the absolute value of the second system three-phase sum It2 is not greater than the determination threshold E2. The second condition is satisfied when the absolute value of the first system three-phase sum It1 is not greater than the determination threshold E2, and the absolute value of the second system three-phase sum It2 is greater than the determination threshold E2. The determination threshold E2 is set to half the determination threshold E1. The determination threshold E1 is hereinafter sometimes referred to as the "first determination threshold E1", and the determination threshold E2 is hereinafter sometimes referred to as the "second determination threshold E2".

That is, at S204, it is determined whether the abnormality in the power converter 1 results from the short-circuit failure or the overcurrent failure occurring in one of the first system 100 and the second system 200. Since the detection process proceeds to S204 if an affirmative determination is made at S201, the sum of the absolute value of the first system three-phase sum It1 and the absolute value of the second system three-phase sum It2 is greater than the first determination threshold E1. When the short-circuit failure occurs, the absolute value of the first system three-phase sum It1 becomes equal to the absolute value of the second system three-phase sum It2 based on assumption that no detection error occurs. Therefore, when the short-circuit failure occurs, each of the absolute value of the first system three-phase sum It1 and the absolute value of the second system three-phase sum It2 becomes greater than the second determination threshold E2.

That is, when the sum of the absolute value of the sum of the phase currents of the first winding set 18 and the absolute value of the sum of the phase currents of the second winding set 19 is greater than the first determination threshold E1, and each of the absolute value of the sum of the phase currents of the first winding set 18 and the absolute value of the sum of the phase currents of the second winding set 19 is greater than the second determination threshold E2 less than the first determination threshold E1, it is determined that the short-circuit failure occurs. It is preferable that the determination threshold E2 should be half the determination threshold E1.

In contrast, when the overcurrent failure occurs in one system, the sum of the three phase currents of the other system becomes zero in theory based on assumption that no detection error occurs. Therefore, the sum of the three phase currents of the other system becomes less than the second determination threshold E2.

That is, when the sum of the absolute value of the sum of the phase currents of the first winding set 18 and the absolute value of the sum of the phase currents of the second winding set 19 is greater than the first determination threshold E1, one of the absolute value of the sum of the phase currents of the first winding set 18 and the absolute value of the sum of the phase currents of the second winding set 19 is greater than the second determination threshold E2, and the other of the absolute value of the sum of the phase currents of the first winding set 18 and the absolute value of the sum of the phase currents of the second winding set 19 is not greater than the second determination threshold E2, it is determined that the overcurrent condition occurs in the system where the absolute value of the sum of the phase currents is greater than the second determination threshold value E2.

In this way, at S204, it is determined whether the abnormality in the power converter 1 results from the short-circuit failure or the overcurrent failure occurring in one of the first system 100 and the second system 200.

If each of the absolute value of the first system three-phase sum Id and the absolute value of the second system three-phase sum It2 is greater than the second determination threshold E2 corresponding to NO at S204, the detection process proceeds to S210. In contrast, when the absolute value of the first system three-phase sum It1 is greater than the second determination threshold E2, and the absolute value of the second system three-phase sum It2 is not greater than the second determination threshold E2, or when the absolute value of the first system three-phase sum It1 is not greater than the second determination threshold E2, and the absolute value of the second system three-phase sum It2 is greater than the second determination threshold E2 corresponding to YES at S204, the detection process proceeds to S205.

At S205, it is determined whether the absolute value of the first system three-phase sum It1 is greater than the second determination threshold E2. If it is determined that the absolute value of the first system three-phase sum It1 is not greater than the second determination threshold E2 corresponding to NO at S205, the detection process proceeds to S208. In contrast, if it is determined that the absolute value of the first system three-phase sum It1 is greater than the second determination threshold E2 corresponding to YES at S205, the detection process proceeds to S206.

At S206, it is determined that the overcurrent failure occurs in the first system 100.

At S207, the first system 100 stops being driven, and the second system 200 continues being driven. Thus, the motor 10 can continue being driven by using the normal second system 200 without using the abnormal first system 100.

At S208, to which the detection process proceeds if it is determined that the absolute value of the first system three-phase sum It1 is not greater than the second determination threshold E2 corresponding to NO at S205, i.e., to which the detection process proceeds if the absolute value of the second system three-phase sum It2 is greater than the second determination threshold E2, it is determined that the overcurrent failure occurs in the second system 200.

At S209, the second system 200 stops being driven, and the first system 100 continues being driven. Thus, the motor 10 can continue being driven by using the normal first system 100 without using the abnormal second system 200.

At S210, to which the detection process proceeds if each of the absolute value of the first system three-phase sum It1 and the absolute value of the second system three-phase sum It2 is greater than the second determination threshold E2 corresponding to NO at S204, it is determined that the short-circuit failures occurs between the first system 100 and the second system 200.

At S211, like at S104 in FIG. 7, one of the first inverter 20 and the second inverter 30 stops being driven, and the other of the first inverter 20 and the second inverter 30 continues being driven, so that the motor 10 continues being driven by one system. Thus, when the short-circuit failure occurs between the first system 100 and the second system 200, the motor 10 is driven in a back up manner by one system.

Thus, according to the second embodiment, when it is determined that the power converter 1 is abnormal, it is possible to suitably determine, based on the phase currents Iu, Iv1, Iw1, Iu2, Iv2, and Iw2, whether the abnormality in the power converter 1 results from the short-circuit between the first system 100 and the second system 200 or the overcurrent in one of the first system 100 and the second system 200.

Correspondence between terms used in the second embodiment and claims is as follows. S201, S202, S203, S204, and S210 in FIG. 8 correspond to procedures as a function of a failure detector.

Third Embodiment

A third embodiment of the present disclosure is described below with reference to FIG. 9. The third embodiment differs from the preceding embodiments in the short-circuit failure detection process for detecting the short-circuit failure between the first system 100 and the second system 200.

Figure 9:
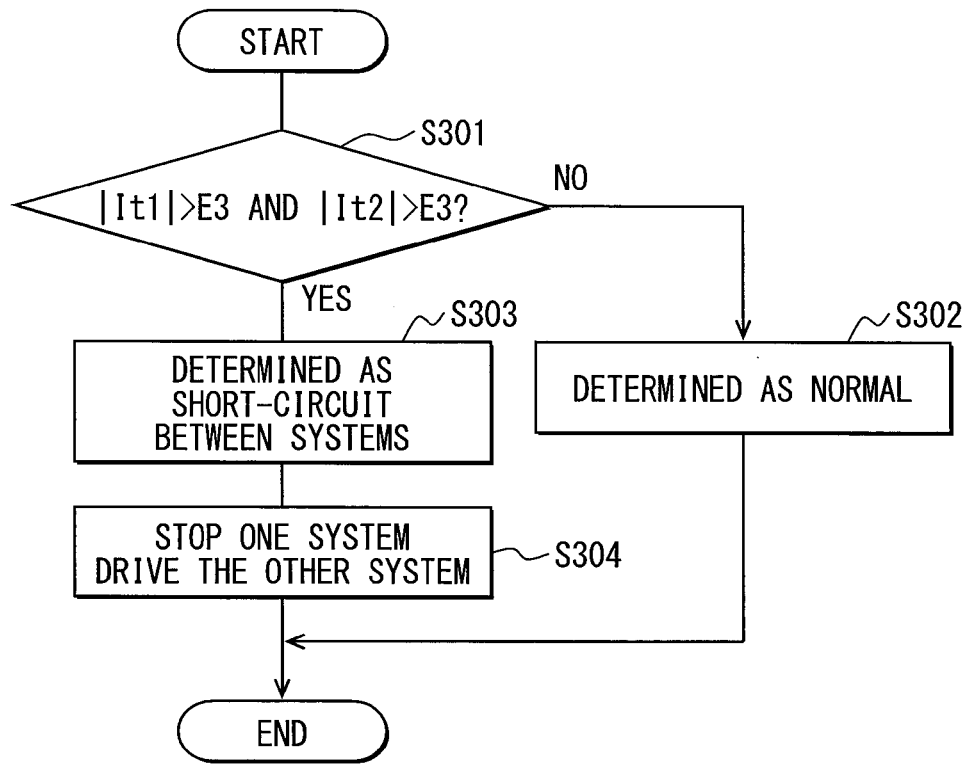
FIG. 9 is a flowchart of a failure detection process according to the third embodiment of the present disclosure.

The detection process according to the third embodiment is shown in FIG. 9 and performed by the microcomputer 51 of the control section 50 at a predetermined time interval.

The detection process starts at S301, where it is determined whether each of the absolute value of the first system three-phase sum It1 and the absolute value of the second system three-phase sum It2 is greater than a predetermined determination threshold E3. According to the third embodiment, the determination threshold E3 is equal to the determination threshold E2 of the second embodiment. Alternatively, the determination threshold E3 can be different from the determination threshold E2. When each of the absolute value of the first system three-phase sum It1 and the absolute value of the second system three-phase sum I*t*2 is greater than the determination threshold E3 corresponding to YES at S301, the detection process proceeds to S303. In contrast, at least one of the absolute value of the first system three-phase sum It1 and the absolute value of the second system three-phase sum It2 is not greater than the determination threshold E3 corresponding to NO at S301, the detection process proceeds to S302.

Procedures performed at S302, S303, and S304 are the same as the procedures performed at S102, S103, and S104 in FIG. 7, respectively.

As described above, according to the third embodiment, it is determined whether the short-circuit occurs between the first system 100 and the second system 200 based on the absolute value of the first system three-phase sum It1, which is the sum of the phase currents Iut Iv1, and Iw1 of the first winding set 18, and the absolute value of the second system three-phase sum It2, which is the sum of the phase currents Iu2, Iv2, and Iw2 of the second winding set 19. Specifically, it is determined that the short-circuit occurs, when each of the absolute value of the first system three-phase sum It1 and the absolute value of the second system three-phase sum I*t*2 is greater than the determination threshold E3. Thus, it is possible to suitably detect the short-circuit between the first system 100 and the second system 200 based on the phase currents Iu, Iv1, Iw1, Iu2, Iv2, and Iw2.

Correspondence between terms used in the third embodiment and claims is as follows. S301, S302, and S303 in FIG. 9 correspond to procedures as a function of a failure detector.

Fourth to Eighth Embodiments

Fourth to eighth embodiments of the present disclosure are described below. Firstly, the fourth to eighth embodiments are collectively described in brief, and then each of the fourth to eighth embodiments is described in detail.

The fourth to eighth embodiments differ from the first to third embodiments as follows.

Figure 10:
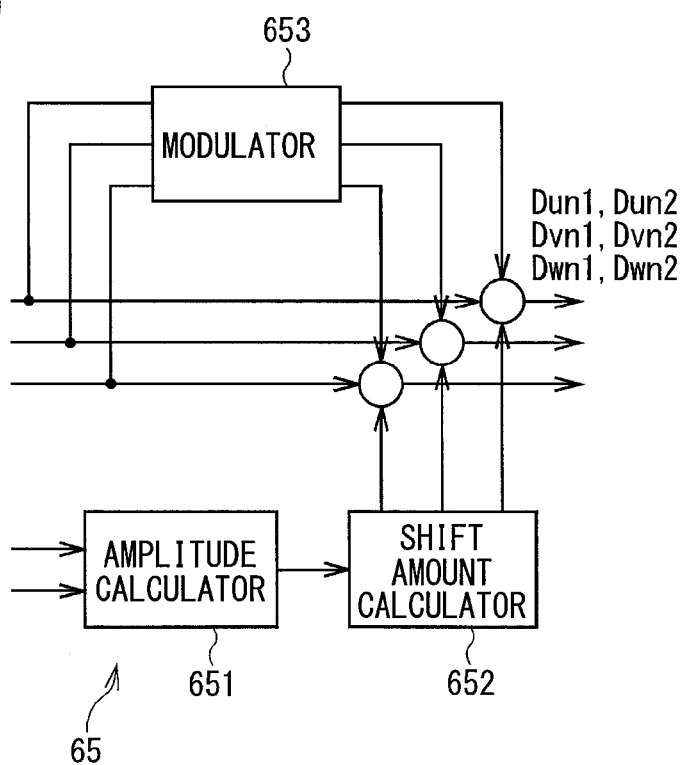
FIG. 10 is a block diagram of a duty converter according to fourth to eighth embodiments of the present disclosure.

In the first to third embodiments, the first duty command signal D11 and the second duty command signal D12 are sinusoidal signals. In contrast, in the fourth to eighth embodiments, the first duty command signal D11 and the second duty command signal D12 as sinusoidal signals are modulated. That is, in the fourth to eighth embodiments, as shown, for example, in FIG. 10, the duty converter 65 includes a modulator 653 in addition to the amplitude calculator 651 and the shift amount calculator 652. The modulator 653 performs a modulation process to modulate a waveform of a reference sinusoidal wave.

In the fourth to eighth embodiments, the outputtable duty range is the same as that in the first embodiment and has the lower limit value Rmin, the upper limit value Rmax, and the output center value Rc. The first duty command signal and the second duty command signal are respectively referred to as the "first duty command signal Dn1" and the "second duty command signal Dn2", where n represents the number of the embodiments. For example, in the fourth embodiment, the first duty command signal and the second duty command signal are respectively referred to as the "first duty command signal D41" and the "second duty command signal D42". The same is true for the center value, the minimum value, the maximum value, the amplitude, and the displacement. The first duty command signal Dn1 and the second duty command signal Dn2 correspond to a first voltage command signal and a second voltage command signal recited in claims, respectively.

In the fourth to eighth embodiments, the first duty command signal Dn1 and the second duty command signal Dn2 are modulated so that they cannot be sinusoidal wave signals. Therefore, the amplitude An1 of the first duty command signal Dn1 is defined as a value obtained by dividing a difference between the maximum value Dmaxn1 and the minimum value Dminn1 of the first duty command signal Dn1 by two. Alternatively, the amplitude An1 can be defined as a difference between the maximum value Dmaxn1 or the minimum value Dminn1 and the center value Dcn1 of the first duty command signal Dn1. The same is true for the second duty command signal Dn2.

Further, in the fourth to eighth embodiments, like in the preceding embodiments, the first duty command signal Dn1 is shifted in the lower direction, and the second duty command signal Dn2 is shifted in the higher direction. When the amplitude An1 of the first duty command signal Dn1 and the amplitude An2 of the second duty command signal Dn2 are not greater than 25% of the outputtable duty range, the first duty command signal Dn1 and the second duty command Dn2 are shifted so that the maximum value Dmaxn1 of the first duty command signal Dn1 and the minimum value Dminxn1 of the first duty command signal Dn1 can be equal to the output center value Rc.

In contrast, when the amplitude An1 of the first duty command signal Dn1 and the amplitude An2 of the second duty command signal Dn2 are greater than 25% of the outputtable duty range, the first duty command signal Dn1 is shifted so that the minimum value Dminn1 of the first duty command signal Dn1 can be equal to the lower limit value Rmin of the outputtable duty range, and the second duty command signal Dn2 is shifted so that the maximum value Dmax2 of the second duty command signal Dn2 can be equal to the upper limit value Rmax of the outputtable duty range.

Fourth Embodiment

A modification process performed by the modulator 653 according to the fourth embodiment is described below with reference to FIGS. 11A and 11B, and 12A and 12B.

Figure 11A:
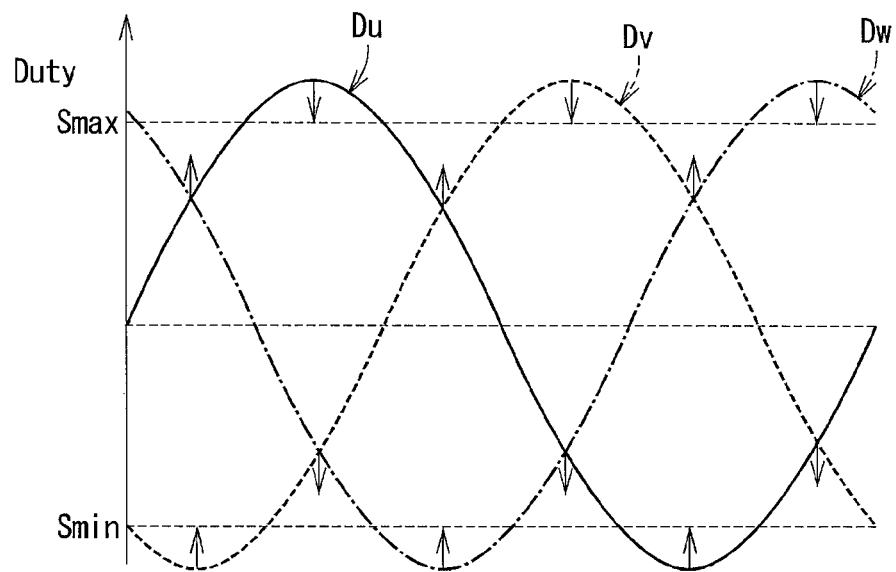
FIGS. 11A and 11B are diagrams for explaining a modulation process according to the fourth embodiment.
Figure 11B:
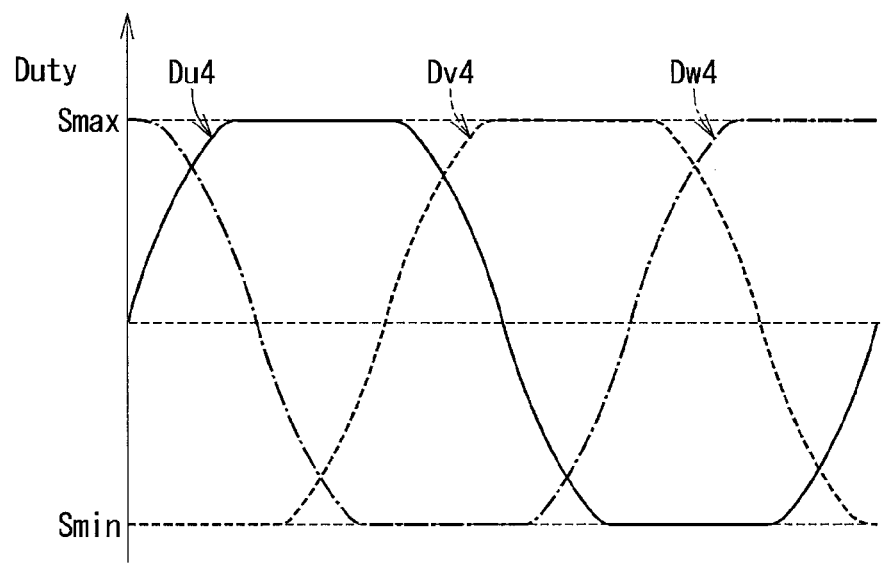

In the modulator 653 according to the fourth embodiment, an excess duty correction process shown in FIGS. 11A and 11B is performed as the modulation process. In the excess duty correction process, modulation signals Du4, Dv4, and Dw4 shown in FIG. 11B are calculated by modulating reference sinusoidal waves Du, Dv, and Dw shown in FIG. 11A based on values of the reference sinusoidal waves Du, Dv, and Dw falling outside a range from a reference maximum value Smax to a reference minimum value Smin. Specifically, a value obtained by subtracting the reference minimum value Smin from a duty of a phase below the reference minimum value Smin is subtracted from a duty of another phase, and a value obtained by subtracting the reference maximum value Smax from a duty of a phase above the reference maximum value Smax is subtracted from a duty of another phase. Thus, the reference sinusoidal waves Du, Dv, and Dw shown in FIG. 11A are modulated to the modulation signals Du4, Dv4, and Dw4 shown in FIG. 11B, respectively.

It is noted that the amplitudes of the reference sinusoidal waves Du, Dv, and Dw are $2/(\sqrt{3})$ times (i.e., about 1.154 times) greater than the amplitudes of the modulation signals Du4, Dv4, and Dw4.

Figures 12A, 12B, 12C:
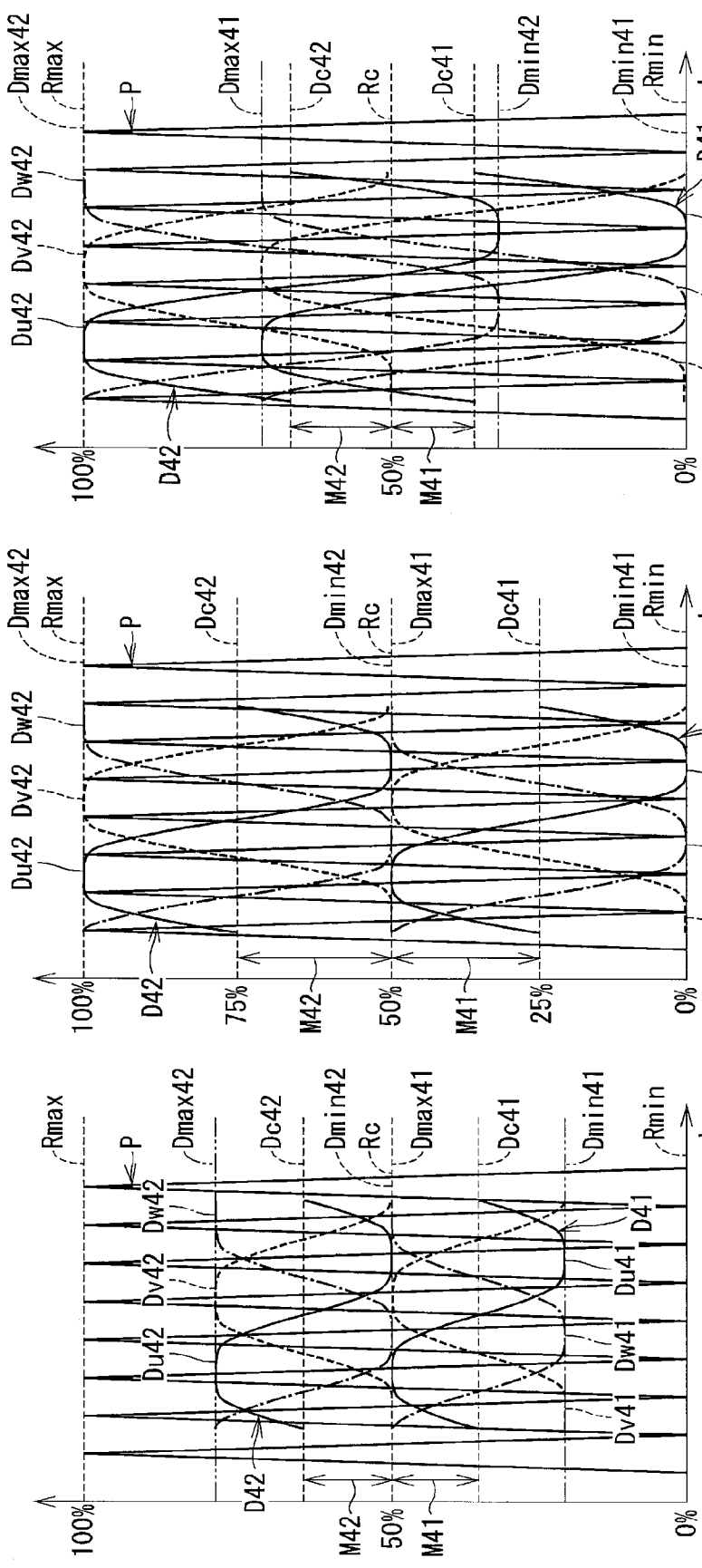
FIGS. 12A, 12B, and 12C are diagrams for explaining first and second duty command signals according to the fourth embodiment.

FIGS. 12A-12C show a first duty command signal D41 and a second duty command signal D42 according to the fourth embodiment. The first duty command signal D41 includes duties Du41, Dv41, and Dw41 as the modulation signals Du4, Dv4, and Dw4. The second duty command signal D42 includes duties Du42, Dv42, and Dw42 as the modulation signals Du4, Dv4, and Dw4. A shift amount M41 of the first duty command signal D41 changes depending on an amplitude A41 of the first duty command signal D41. A shift amount M42 of the second duty command signal D42 changes depending on an amplitude A42 of the second duty command signal D42. FIG. 12A shows an example when the amplitude A41 of the first duty command signal D41 and the amplitude A42 of the second duty command signal D42 are not greater than 25% of the outputtable duty range. FIG. 12B shows an example when the amplitude A41 of the first duty command signal D41 and the amplitude A42 of the second duty command signal D42 are equal to 25% of the outputtable duty range. FIG. 12C shows an example when the amplitude A41 of the first duty command signal D41 and the amplitude A42 of the second duty command signal D42 are greater than 25% of the outputtable duty range.

The modulation process according to the fourth embodiment can be used in combination with the failure detection process according to any one of the first to third embodiments.

According to the fourth embodiment, the first voltage command signal D41 and the second voltage command signal D42 are modulated from sinusoidal wave signals to another signals. Thus, a voltage utilization can be increased.

Fifth Embodiment

Figure 13A:
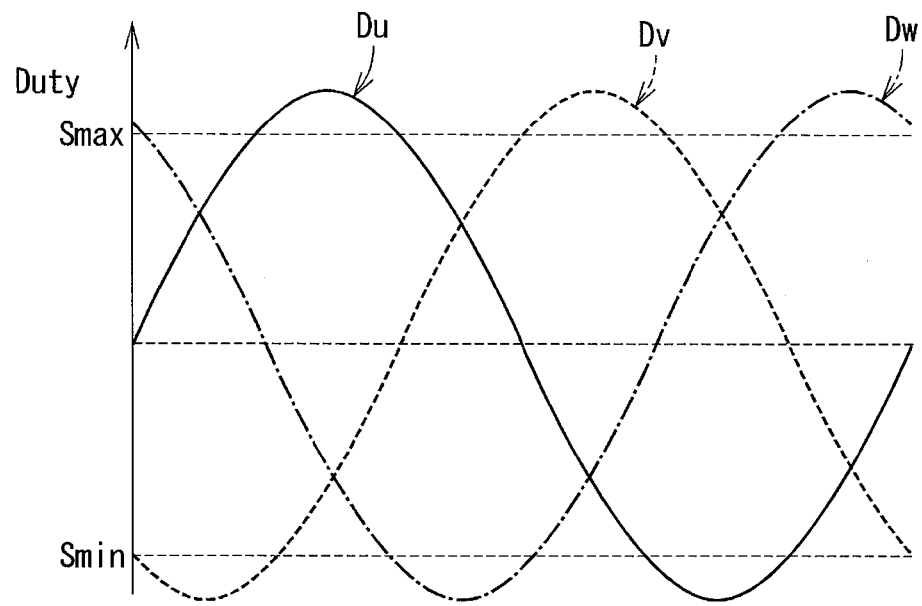
FIGS. 13A and 13B are diagrams for explaining a modulation process according to the fifth embodiment.
Figure 13B:
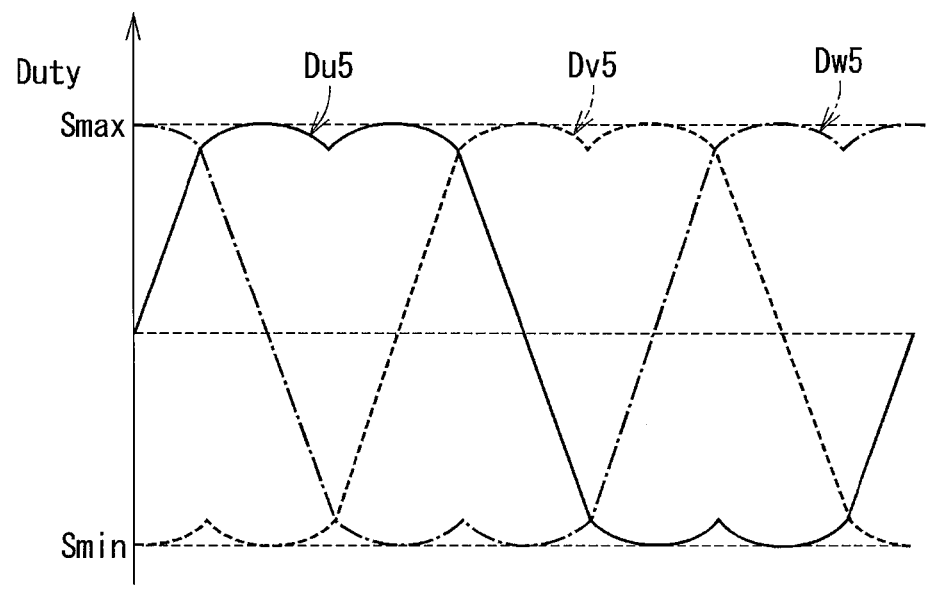

A modification process performed by a modulator 653 according to the fifth embodiment is described below with reference to FIGS. 13A and 13B, and 14A and 14B. In the modulator 653 according to the fifth embodiment, a duty equalization process shown in FIGS. 13A and 13B is performed as the modulation process. In the duty equalization process, modulation signals Du5, Dv5, and Dw5 shown in FIG. 13B are calculated by modulating reference sinusoidal waves Du, Dv, and Dw shown in FIG. 13A based on the following formulas (1), (2), and (3), where Dmax represents a maximum value of the reference sinusoidal wave, and Dmin represents a minimum value of the reference sinusoidal wave.

$$Du5 = Du - (Dmax - Dmin)/2 \quad (1)$$

$$Dv5 = Dv - (Dmax - Dmin)/2 \quad (2)$$

$$Dw5 = Dw - (Dmax - Dmin)/2 \quad (3)$$

Thus, the reference sinusoidal waves Du, Dv, and Dw shown in FIG. 13A are modulated to modulation signals Du5, Dv5, and Dw5 shown in FIG. 13B, respectively.

FIGS. 14A-14C show a first duty command signal D51 and a second duty command signal D52 according to the fifth embodiment. The first duty command signal D51 includes duties Du51, Dv51, and Dw51 as the modulation signals Du5, Dv5, and Dw5. The second duty command signal D52 includes duties Du52, Dv52, and Dw52 as the modulation signals Du5, Dv5, and Dw5. Like in the preceding embodiments, a shift amount M51 of the first duty command signal D51 changes depending on an amplitude A51 of the first duty command signal D51, and a shift amount M52 of the second duty command signal D52 changes depending on an amplitude A52 of the second duty command signal D52.

The modulation process according to the fifth embodiment can be used in combination with the failure detection process according to any one of the first to third embodiments.

According to the fifth embodiment, the first voltage command signal D51 and the second voltage command signal D52 are modulated from sinusoidal wave signals to another signals. Thus, a voltage utilization can be increased.

Sixth Embodiment

Figure 15A:
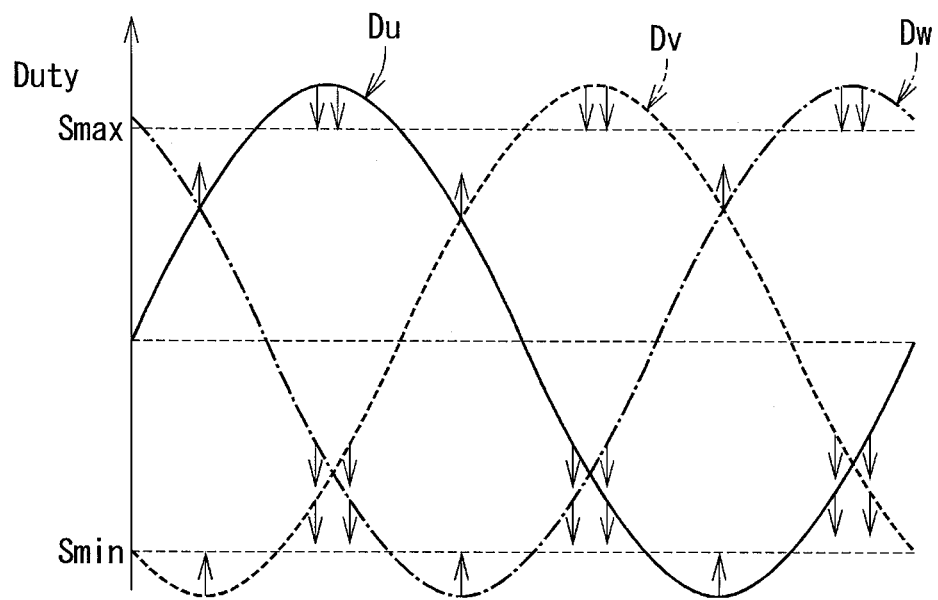
FIGS. 15A and 15B are diagrams for explaining a modulation process according to the sixth embodiment.
Figure 15B:
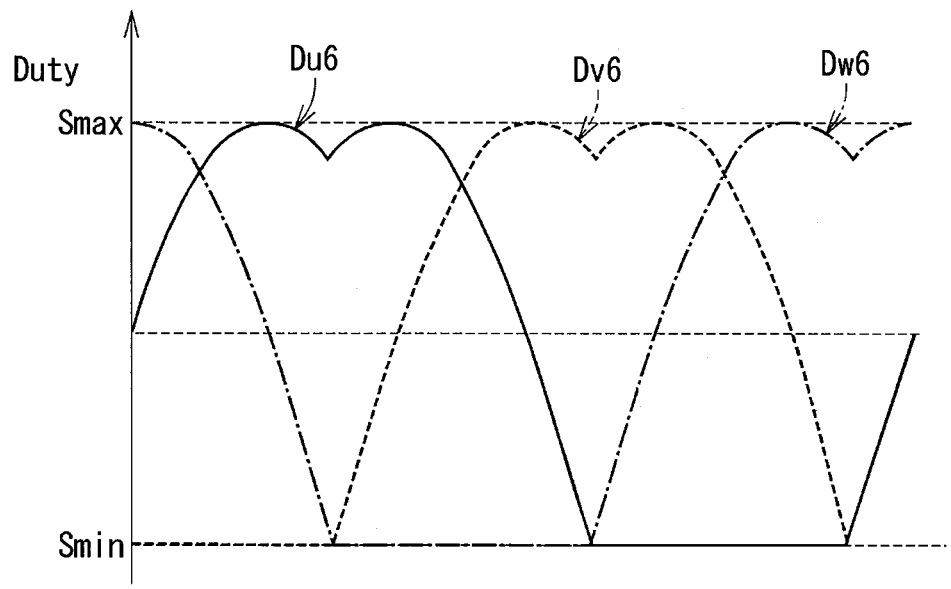

A modification process performed by a modulator 653 according to the sixth embodiment is described below with reference to FIGS. 15A and 15B, and 16A and 16B. In the modulator 653 according to the sixth embodiment, a first two-phase modulation shown in FIGS. 15A and 15B is performed as the modulation process. In the first two-phase modulation, a duty of one phase is fixed to the reference minimum value Smin. Specifically, according to the sixth embodiment, in the reference sinusoidal waves Du, Dv, and Dw shown in FIG. 15A, a value obtained by subtracting the reference minimum value Smin from a duty of the smallest phase is subtracted from each phase so that the duty of the smallest phase can be equal to the reference minimum value Smin. Thus, the reference sinusoidal waves Du, Dv, and Dw shown in FIG. 15A are modulated to the modulation signals Du6, Dv6, and Dw6 shown in FIG. 15B, respectively.

Figures 16A, 16B, 16C:
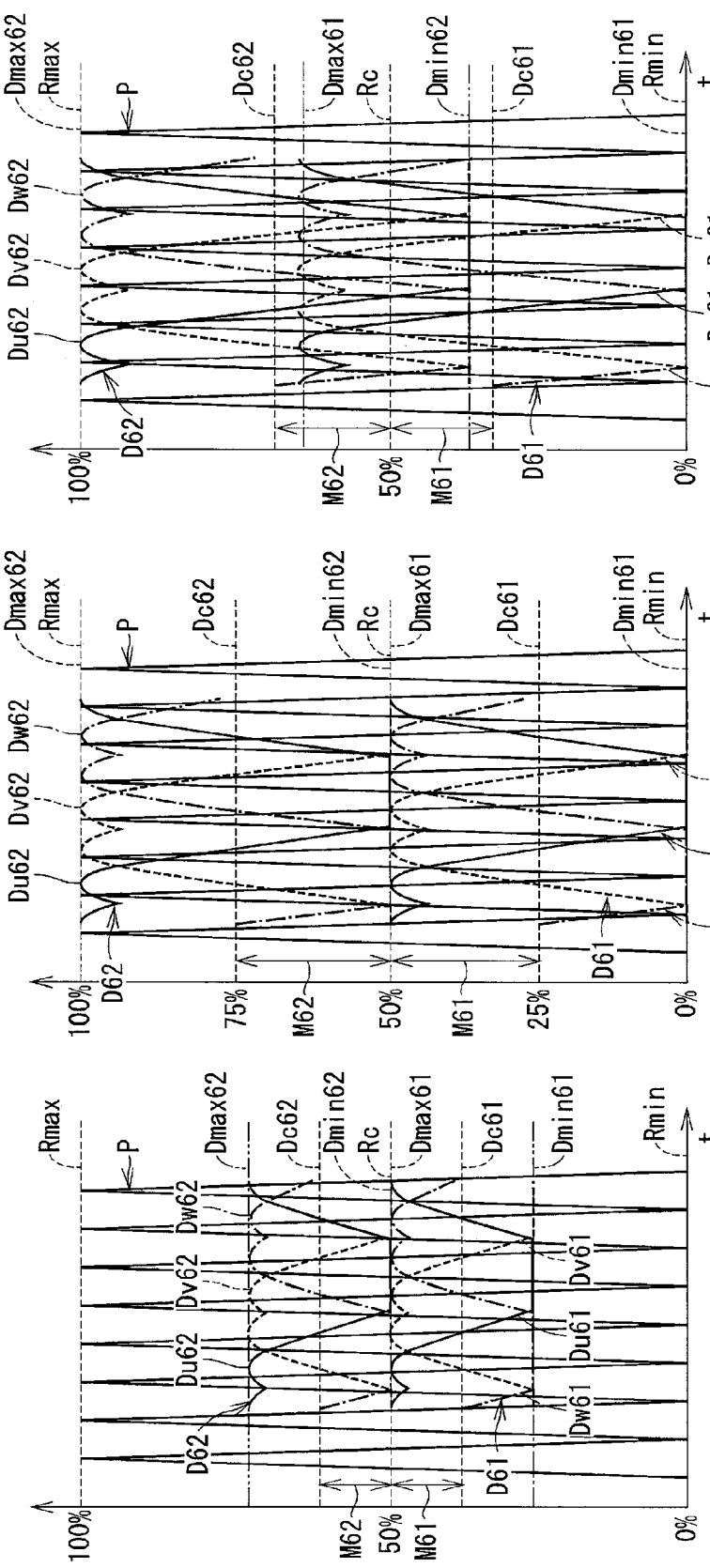
FIGS. 16A, 16B, and 16C are diagrams for explaining first and second duty command signals according to the sixth embodiment.

FIGS. 16A-16C show a first duty command signal D61 and a second duty command signal D62 according to the sixth embodiment. The first duty command signal D61 includes duties Du61, Dv61, and Dw61 as the modulation signals Du6, Dv6, and Dw6. The second duty command signal D62 includes duties Du62, Dv62, and Dw62 as the modulation signals Du6, Dv6, and Dw6. Like in the preceding embodiments, a shift amount M61 of the first duty command signal D61 changes depending on an amplitude A61 of the first duty command signal D61, and a shift amount M62 of the second duty command signal D62 changes depending on an amplitude A62 of the second duty command signal D62.

The modulation process according to the sixth embodiment can be used in combination with the failure detection process according to any one of the first to third embodiments.

According to the sixth embodiment, the first voltage command signal D61 and the second voltage command signal D62 are modulated from sinusoidal wave signals to another signals. Thus, a voltage utilization can be increased.

Seventh Embodiment

Figure 17A:
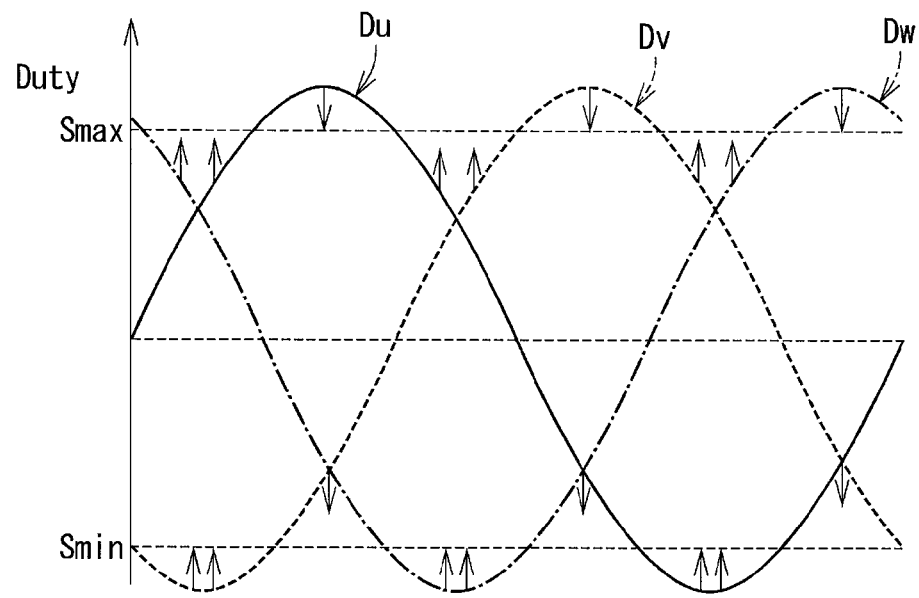
FIGS. 17A and 17B are diagrams for explaining a modulation process according to the seventh embodiment.
Figure 17B:
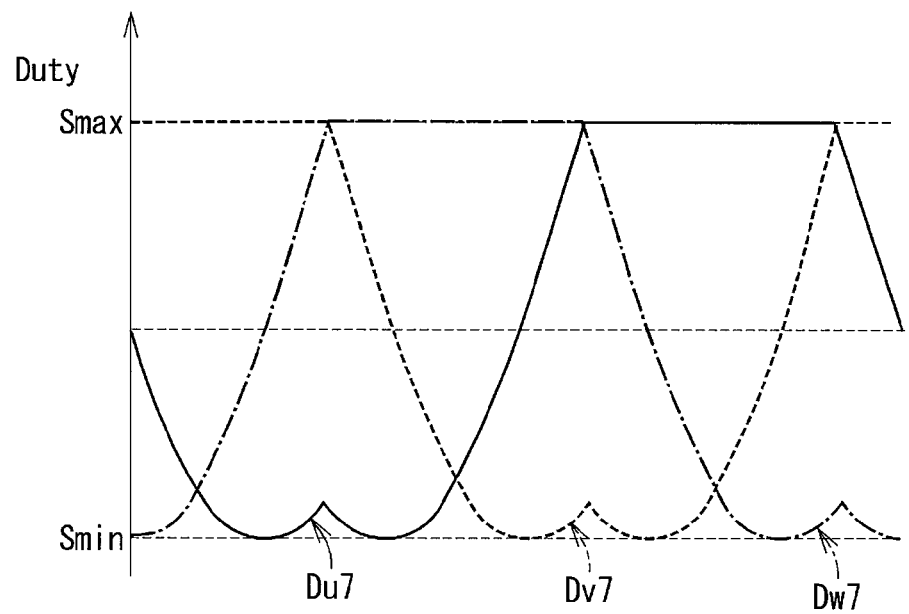

A modification process performed by a modulator 653 according to the seventh embodiment is described below with reference to FIGS. 17A and 17B, and 18A and 18B. In the modulator 653 according to the seventh embodiment, a second two-phase modulation shown in FIGS. 17A and 17B is performed as the modulation process. In the second two-phase modulation, a duty of one phase is fixed to the reference maximum value Smax. Specifically, according to the seventh embodiment, in reference sinusoidal waves Du, Dv, and Dw shown in FIG. 17A, a value obtained by subtracting the reference maximum value Smax from a duty of the largest phase is subtracted from each phase so that the duty of the largest phase can be equal to the reference maximum value Smax. Thus, the reference sinusoidal waves Du, Dv, and Dw shown in FIG. 17A are modulated to modulation signals Du7, Dv7, and Dw7 shown in FIG. 17B, respectively.

FIGS. 18A-18C show a first duty command signal D71 and a second duty command signal D72 according to the seventh embodiment. The first duty command signal D71 includes duties Du71, Dv71, and Dw71 as the modulation signals Du7, Dv7, and Dw7. The second duty command signal D72 includes duties Du72, Dv72, and Dw72 as the modulation signals Du7, Dv7, and Dw7. Like in the preceding embodiments, a shift amount M71 of the first duty command signal D71 changes depending on an amplitude A71 of the first duty command signal D71, and a shift amount M72 of the second duty command signal D72 changes depending on an amplitude A72 of the second duty command signal D72.

The modulation process according to the seventh embodiment can be used in combination with the failure detection process according to any one of the first to third embodiments.

According to the seventh embodiment, the first voltage command signal D71 and the second voltage command signal D72 are modulated from sinusoidal wave signals to another signals. Thus, a voltage utilization can be increased.

Eighth Embodiment

A modification process performed by a modulator 653 according to the eighth embodiment is described below with reference to FIGS. 19A, 19B, and 19C. According to the eighth embodiment, the modulator 653 applies the first two-phase modulation, which is described in the sixth embodiment, to a first duty command signal D81 and applies the second two-phase modulation, which is described in the seventh embodiment, to a second duty command signal D82.

Thus, a voltage utilization can be increased.

Specifically, according to the eighth embodiment, in the first duty command signal D81, a value obtained by subtracting the reference minimum value Smin from a duty of the smallest phase of reference sinusoidal waves Du, Dv, and Dw is subtracted from each phase so that the duty of the smallest phase can be equal to the reference minimum value Smin. Likewise, in the second duty command signal D82, a value obtained by subtracting the reference maximum value Smax from a duty of the largest phase of reference sinusoidal waves Du, Dv, and Dw is subtracted from each phase so that the duty of the largest phase can be equal to the reference maximum value Smax.

That is, the first two-phase modulation is applied to the first duty command signal D81 to be shifted in the lower direction, and the second two-phase modulation is applied to the second duty command signal D82 to be shifted in the higher direction. In such an approach, the difference between the first neutral-point voltage Va1, which is an average of the voltages applied to the first winding set 18, and the second neutral-point voltage Va2, which is an average of the voltages applied to the second winding set 19, can be increased. Accordingly, the short-circuit current Is is increased. Therefore, the short-circuit between the first system 100 and the second system 200 can be suitably detected.

Modifications

The embodiments can be modified in various ways, for example, as follows.

(1) In the embodiments, the first duty command signal and the second duty command signal are in phase and have the same amplitude. Alternatively, the first duty command signal and the second duty command signal can be out of phase and can have different amplitudes.

(2) In the embodiments, the first duty command signal is shifted in the lower direction from the output center value, and the second duty command signal is shifted in the higher direction from the output center value. Alternatively, for example, as long as the first neutral-point voltage Va1 and the second neutral-point voltage Va2 become different from each other, only one of the first duty command signal and the second duty command signal can be shifted from the output center value. Further, the shift amount of the first duty command signal can be different from the shift amount of the second duty command signal.

(3) In the embodiments, the shift amounts of the first duty command signal and the second duty command signal can change depending on the respective amplitudes. Alternatively, the shift amounts of the first duty command signal and the second duty command signal can be kept constant regardless of the amplitudes. For example, the minimum value of the first duty command signal can be set to the lower limit value of the outputtable duty range, and the maximum value of the second duty command signal can be set to the upper limit value of the outputtable duty range. In such an approach, the difference between the first neutral-point voltage Va1 and the second neutral-point voltage Va2 can be made as large as possible. Accordingly, the short-circuit current Is can be increased, and therefore the short-circuit between the first system 100 and the second system 200 can be suitably detected.

Further, for example, when the amplitude of the first duty command signal and the amplitude of the second duty command signal are not greater than 25% of the outputtable duty range, the center value of the first duty command signal to be shifted in the lower direction can be fixed to 25% of the outputtable duty range, and the center value of the second duty command signal to be shifted in the higher direction can be fixed to 75% of the outputtable duty range. Further, when the amplitude of the first duty command signal and the amplitude of the second duty command signal are greater than 25% of the outputtable duty range, the minimum value of the first duty command signal can be set to the lower limit value of the outputtable duty range, and the maximum value of the second duty command signal can be set to the upper limit value of the outputtable duty range.

(4) In the fourth to seventh embodiments, the first duty command signal and the second duty command signal are modulated in the same modulation process. Alternatively, like in the eighth embodiment, the first duty command signal and the second duty command signal can be modulated in different modulation processes. For example, the first duty command signal can be modulated in the modulation process described in the fourth embodiment, and the second duty command signal can be modulated in the modulation process described in the fifth embodiment. Alternatively, only one of the first duty command signal and the second duty command signal can be modulated without modulating the other of the first duty command signal and the second duty command signal.

(5) In the embodiments, the duty of each phase is calculated after the shift amount of the three-phase voltage command value is calculated. Alternatively, the phase shift of each phase can be calculated after the duty of each phase is calculated from the three-phase voltage command value.

(6) In the embodiments, the first inverter and the second inverter are driven and controlled based on the same PWM reference signal. Alternatively, the first inverter and the second inverter can be driven and controlled based on different PWM reference signals.

(7) In the embodiments, the current sensor is constructed with shunt resistors. Alternatively, the current sensor can be constructed with other devices such as Hall effect devices. The current sensor can be located at any position where the current sensor can detect the phase current. For example, the current sensor can be located on a high potential side of the upper MOSFET or located at a terminal of each coil of the winding set.

In the embodiments, the outputtable duty range is from 0% to 100% of the capacitor voltage Vc. By the way, strictly speaking, when the current sensor is constructed with shunt resistors, there is a need to provide a period of time where all the upper MOSFETs are OFF or all the lower MOSFETs are OFF. In addition, a period of time necessary for ringing to be suppressed is needed, and a period of time where ON/OFF switching of the MOSFETs is not performed is needed. Therefore, the outputtable duty range can change depending on a period of time necessary for the current detector to detect the current.

Further, in a bootstrap drive circuit, since there is a need to turn OFF all lower MOSFETs at a predetermined time interval, it is impossible to set the upper limit value of the outputtable duty range to 100% of the capacitor voltage Vc. Therefore, the upper limit value of the outputtable duty range can change depending on a configuration of the drive circuit.

(8) In the embodiments, the first inverter and the second inverter drives one motor. Alternatively, the first inverter and the second inverter can separately drive different motors.

(9) In the embodiments, two systems, each of which has one winding set and one inverter, are provided. Alternatively, three or more systems, each of which has one winding set and one inverter, can be provided. For example, when three system X, Y, and Z are provided, a winding set and an inverter of the system X can be respectively regarded as a first winding set and a first inverter, and a winding set and an inverter of the system Y can be respectively regarded as a second winding set and a second inverter. Likewise, a winding set and an inverter of the system Y can be respectively regarded as a first winding set and a first inverter, and a winding set and an inverter of the system Z can be respectively regarded as a second winding set and a second inverter.

(10) In the embodiments, the switching device of the inverter is a MOSFET. The switching device is not limited to a MOSFET, but can include a thyristor and a transistor such as an insulated gate bipolar transistor (IGBT).

(11) In the embodiments, the rotating electrical machine is a three-phase brushless motor. Alternatively, the rotating electrical machine can be a motor other than a three-phase brushless motor. Further, the rotating electrical machine is not limited to a motor. For example, the rotating electrical machine can be a power generator or a motor generator which can serve as not only a motor but also a power generator.

(12) In the embodiments, the rotating electrical machine is used for an electric power steering apparatus mounted on a vehicle. Alternatively, the rotating electrical machine can be used for a vehicle apparatus other than the electric power steering apparatus. Further, the rotating electrical machine can be used for an apparatus other than a vehicle apparatus.

What is claimed is:

1. A power converter for a rotating electrical machine, the rotating machine including a first winding set having coils corresponding to phases of the rotating electrical machine and a second winding set having coils corresponding to the phases of the rotating electrical machine, the power converter comprising:

a first inverter configured to energize the first winding set;
a second inverter configured to energize the second winding set;
a current sensor configured to detect a phase current flowing through each coil; and
a control section configured to drive the first inverter based on a first voltage command signal and a PWM reference signal, and configured to drive the second inverter based on a second voltage command signal and the PWM reference signal, wherein
the first inverter and the first winding set form a first system,
the second inverter and the second winding set form a second system,
the control section includes a voltage command signal calculator and a failure detector, the voltage command signal calculator calculates the first voltage command signal and the second voltage command signal in such a manner that a first neutral-point voltage and a second neutral-point voltage are different from each other, the first neutral-point voltage is an average value of voltages applied to the first winding set, the second neutral-point voltage is an average value of voltages applied to the second winding set, and the failure detector is configured to detect whether a short-circuit occurs between the first system and the second system based on each phase current and whether an overcurrent failure occurs in the first system or the second system, the failure detector determines whether an abnormality results from the short-circuit failure or an overcurrent failure occurs in the first system or the second system, when the failure detector determines that the abnormality results from the overcurrent failure, the failure detector determines whether the overcurrent failure occurs in the first system or the second, the failure detector determines that the short-circuit failure occurs:
- when a total sum of an absolute value of a sum of the phase currents of the first winding set and an absolute value of a sum of the phase currents of the second winding set is greater than a first determination threshold, and
- when each of the absolute value of the sum of the phase currents of the first winding set and the absolute value of the sum of the phase currents of the second winding set is greater than a second determination threshold which is less than that first determination threshold.

2. The power converter according to claim 1, wherein the voltage command signal calculator calculates the first voltage command signal and the second voltage command signal in such a manner that a difference between the first neutral-point voltage and the second neutral-point voltage is not less than the sum of an amplitude of a voltage applied to each coil of the first winding set and an amplitude of a voltage applied to each coil of the second winding set.

3. The power converter according to claim 1, wherein the failure detector detects whether the short-circuit occurs based on the sum of an absolute value of a first system sum and an absolute value of a second system sum, the first system sum is the sum of the phase currents flowing through the coils of the first winding set, and the second system sum is the sum of the phase currents flowing through the coils of the second winding set.

4. The power converter according to claim 1, wherein when the failure detector detects the short-circuit, the control section stops driving one of the first inverter and the second inverter and continues driving the other of the first inverter and the second inverter.

5. The power converter according to claim 1, wherein the voltage command signal calculator modulates at least one of the first voltage command signal and the second voltage command signal from a sinusoidal wave signal to another signal.

6. The power converter according to claim 5, wherein in one of the first voltage command signal and the second voltage command signal, the voltage command signal calculator subtracts a value, which is obtained by subtracting a reference minimum value from a duty of the smallest phase of the sinusoidal wave, from each phase so that the duty of the smallest phase becomes equal to the reference minimum value, and in the other of the first voltage command signal and the second voltage command signal, the voltage command signal calculator subtracts a value, which is obtained by subtracting a reference maximum value from a duty of the largest phase of the sinusoidal wave, from each phase so that the duty of the largest phase becomes equal to the reference maximum value.

7. The power converter according to claim 1, wherein the voltage command signal calculator calculates the first voltage command signal so that a first center value, which is a center value of a first duty command signal, is lower than an output center value, which is a center value of an outputtable duty range, and the voltage command signal calculator calculates the second voltage command signal so that a second center value, which is a center value of a second duty command signal, is higher than the output center value.

8. The power converter according to claim 7, wherein the voltage command signal calculator calculates the first voltage command signal so that a first shift value, which is a difference between the first center value and the output center value, changes depending on an amplitude of the first voltage command signal, and the voltage command signal calculator calculates the second voltage command signal so that a second shift value, which is a difference between the second center value and the output center value, changes depending on an amplitude of the second voltage command signal.

9. The power converter according to claim 8, wherein the voltage command signal calculator calculates the first voltage command signal so that a maximum value of the first voltage command signal becomes equal to the output center value, and the voltage command signal calculator calculates the second voltage command signal so that a minimum value of the second voltage command signal becomes equal to the output center value.

10. The power converter according to claim 8, wherein the voltage command signal calculator calculates the first voltage command signal so that a minimum value of the first voltage command signal becomes equal to a lower limit value of the outputtable duty range, and the voltage command signal calculator calculates the second voltage command signal so that a maximum value of the second voltage command signal becomes equal to an upper limit value of the outputtable duty range.

11. The power converter according to claim 1, wherein in case where the total sum of the absolute value of the sum of the phase currents of the first winding set and the absolute value of the sum of the phase currents of the second winding set is greater than the first determination:
- when one of the absolute value of the sum of the phase currents of the first winding set and the absolute value of the sum of the phase currents of the second winding set is greater than the second determination threshold, and
- when the other of the absolute value of the sum of the phase currents of the first winding set and the absolute value of the sum of the phase currents of the second winding set is not greater than the second determination threshold, the failure detector determines that the overcurrent failure occurs in the system where the absolute value of the sum of the phase currents is greater than the second determination threshold.

* * * * *